(12) United States Patent
Chang

(10) Patent No.: US 8,346,803 B2
(45) Date of Patent: Jan. 1, 2013

(54) DYNAMIC GENERATION OF TARGET FILES FROM TEMPLATE FILES AND TRACKING OF THE PROCESSING OF TARGET FILES

(75) Inventor: Peter Hon-You Chang, Sterling Heights, MI (US)

(73) Assignee: Knapp Investment Company Limited (VG)

(*) Notice: Subject to any disclaimer, the term of this patent is extended or adjusted under 35 U.S.C. 154(b) by 771 days.

(21) Appl. No.: 12/360,446

(22) Filed: Jan. 27, 2009

(65) Prior Publication Data

US 2009/0183117 A1 Jul. 16, 2009

Related U.S. Application Data

(63) Continuation-in-part of application No. 12/013,223, filed on Jan. 11, 2008, which is a continuation of application No. 11/006,268, filed on Dec. 7, 2004, now Pat. No. 7,320,007.

(60) Provisional application No. 60/529,376, filed on Dec. 12, 2003.

(51) Int. Cl.
 *G06F 17/30* (2006.01)
(52) U.S. Cl. .................................... 707/779; 715/780
(58) Field of Classification Search ................ 707/779, 707/769, 791, 796, 804; 715/810, 205, 234, 715/216, 220, 212, 224, 225, 235, 780; 717/168–178
See application file for complete search history.

(56) References Cited

U.S. PATENT DOCUMENTS

| | | |
|---|---|---|
| 4,974,160 A | 11/1990 | Bone et al. |
| 5,041,967 A | 8/1991 | Ephrath et al. |
| 5,220,675 A | 6/1993 | Padawer et al. |
| 5,345,550 A | 9/1994 | Bloomfield |
| 5,530,796 A | 6/1996 | Wang |
| 5,625,783 A | 4/1997 | Ezekiel et al. |
| 5,630,125 A | 5/1997 | Zellweger |
| 5,678,039 A | 10/1997 | Hinks et al. |
| 5,742,818 A | 4/1998 | Shoroff et al. |
| 5,760,768 A | 6/1998 | Gram |
| 5,778,389 A | 7/1998 | Pruett et al. |
| 5,784,583 A | 7/1998 | Redpath |
| 5,799,325 A | 8/1998 | Rivette et al. |
| 5,864,848 A | 1/1999 | Horvitz et al. |

(Continued)

OTHER PUBLICATIONS

Hohenstein et al., An Approach for Generating File Interferences, Databases Systems for Advanced Applications, 1999. Proceedings., 6th International Conference on Apr. 19-21, 1999, pp. 61-68.

*Primary Examiner* — Greta Robinson
(74) *Attorney, Agent, or Firm* — Chadbourne & Parke LLP

(57) ABSTRACT

Target file generation systems and methods are described, which are optionally for use by ordinary computer users enable those users to readily generate target files without the requirement that they know the internal layout structures of the target files. A user is enabled to select a template file from a plurality of template files via a user interface configured to be displayed on a computer display to the user, wherein the template files include changeable fields associated with corresponding field delimiters and prompting labels. An incomplete software program file containing variable name locations is accessed from memory. The program file is parsed to locate the variable name locations. The label names obtained from the template file selected by the user are inserted into the variable name locations to further complete the software program file. The software program file is stored in computer memory.

16 Claims, 44 Drawing Sheets

U.S. PATENT DOCUMENTS

| | | |
|---|---|---|
| 5,877,966 A | 3/1999 | Morris et al. |
| 5,983,227 A | 11/1999 | Nazem et al. |
| 5,999,180 A | 12/1999 | Coskrey, IV |
| 6,067,087 A | 5/2000 | Krauss et al. |
| 6,112,312 A * | 8/2000 | Parker et al. ............ 714/32 |
| 6,120,550 A | 9/2000 | Southgate et al. |
| 6,177,942 B1 | 1/2001 | Keong et al. |
| 6,236,984 B1 | 5/2001 | Owens et al. |
| 6,243,700 B1 | 6/2001 | Zellweger |
| 6,317,143 B1 | 11/2001 | Wugofski |
| 6,317,787 B1 | 11/2001 | Boyd et al. |
| 6,487,713 B1 | 11/2002 | Cohen et al. |
| 6,751,306 B2 | 6/2004 | Himmel et al. |
| 6,779,153 B1 | 8/2004 | Kagle |
| 6,826,566 B2 | 11/2004 | Lewak et al. |
| 6,886,025 B1 | 4/2005 | Britton |
| 6,895,549 B1 | 5/2005 | Albright et al. |
| 6,898,703 B1 | 5/2005 | Ogami et al. |
| 6,904,568 B2 | 6/2005 | Colgrove |
| 7,020,660 B2 | 3/2006 | Woodring |
| 7,027,975 B1 | 4/2006 | Pazandak et al. |
| 7,152,055 B2 | 12/2006 | Loschky et al. |
| 7,191,167 B1 | 3/2007 | Turba et al. |
| 7,213,202 B1 | 5/2007 | Kagle |
| 7,254,784 B2 | 8/2007 | Chang |
| 7,278,094 B1 | 10/2007 | Dreyer et al. |
| 7,428,699 B1 | 9/2008 | Kane et al. |
| 7,703,021 B1 * | 4/2010 | Flam .......................... 715/741 |
| 2001/0002128 A1 | 5/2001 | Takayama et al. |
| 2002/0065818 A1 | 5/2002 | Starr |
| 2002/0095385 A1 | 7/2002 | McAvoy et al. |
| 2002/0163535 A1 | 11/2002 | Mitchell et al. |
| 2003/0028562 A1 | 2/2003 | Shaughnessy et al. |
| 2003/0098891 A1 | 5/2003 | Molander |
| 2003/0131340 A1 | 7/2003 | McArdle |
| 2004/0083426 A1 | 4/2004 | Sahu |
| 2004/0123286 A1 * | 6/2004 | Kang et al. .................. 717/174 |
| 2004/0143583 A1 | 7/2004 | Poole et al. |
| 2005/0010548 A1 | 1/2005 | Kobayashi |
| 2005/0015379 A1 | 1/2005 | Aureglia et al. |
| 2005/0044491 A1 | 2/2005 | Peterson |
| 2006/0005125 A1 | 1/2006 | Reponen |
| 2009/0019351 A1 | 1/2009 | Hitchcock et al. |
| 2009/0031205 A1 | 1/2009 | Aureglia et al. |
| 2009/0192972 A1 | 7/2009 | Spivack et al. |
| 2009/0192976 A1 | 7/2009 | Spivack et al. |

\* cited by examiner

System Diagram

Graphics User Interface

File Dialog Window

Generated Dialog Window for Menu Information

Generated Dialog Window for Place Holders Information

Menu Items of View Menu

Database Object Model Diagram

Menu Items of Tools Menu

_US 8,346,803 B2_

DYNAMIC GENERATION OF TARGET FILES FROM TEMPLATE FILES AND TRACKING OF THE PROCESSING OF TARGET FILES

CROSS-REFERENCE TO RELATED APPLICATIONS

This application is a continuation in part of U.S. patent application Ser. No. 12/013,223, filed Jan. 11, 2008, which is a continuation of U.S. patent application Ser. No. 11/006,268, filed Dec. 7, 2004, now U.S. Pat. No. 7,320,007, which claims priority from U.S. provisional patent application Ser. No. 60/529,376 filed Dec. 12, 2003, the entire contents of which are incorporated herein by reference.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates in general to systems and methods for the use of template files, and in particular, to methods and systems for generating target file resources of a computer operating system platform from the template files.

2. Description of the Related Art

For any new file resource that is to be a text file, referred here as the target file, that requires changes only for a relatively smaller number of fields, referred here as changeable fields, over a period of time after its creation and that its unchangeable lines and unchangeable fields are known beforehand Many operating system commands and individual application programs that run on various computers create the initial versions of new target files as empty files. Examples of such operating systems programs or application programs include but not limited to text editor program, word processing program, spreadsheet program, and database interface program. The conventional approach is that users of these programs need to manually expand the initial versions of the target files. Many operating systems on various computers allow users to invoke operating system commands and individual programs to process target files that they wish to expand or modify. These operating systems may also allow the user to initiate the execution of various background or system functions to process target files, some of which are quite complex in structures but contain many repetitive unchangeable fields. The tasks of processing these target files are mostly assigned to experienced technical professionals who know the inner structures of the files in details. A shortcoming of the conventional approach is that experienced business non-technical professionals who know the business functions of the programs are kept from directly processing the target files. For target files that are of the text file type, it would be useful to provide template files that contain the known repetitive changeable fields and to provide systems and methods to parse the template files for changeable fields and then dynamically generate dialog frame windows that prompt users, technical or non-technical, to enter input for the changeable fields. This approach saves the complex details of the structures of the target files from the business non-technical users and allows them to directly processing the target files. For target files that are not the text file type, it would be useful to provide to users an option that copies previously created template files to the target files.

Another shortcoming of the conventional approach is that manually expanding empty target files to versions of complex structures tend to be error-prone, even for experienced technical professionals. Moreover if a creator invoked operating systems programs or application programs to create and process too many target files without proper tracking (or logging) the activities, the creator may loose track of the folders (or directories) that store them and the purposes of processing them.

SUMMARY OF THE INVENTION

In light of the foregoing limitations of the conventional approach of manually expanding empty target files and losing track of the activities of processing them, it would be useful to have an easy and largely automatic way to process target files that includes dynamically generating target files from template files and by tracking the processing of the target files for future references. For example, certain embodiments of the present invention may optionally be used to enhance the AutoGenMenu Program ("AGM Program") and the Activity Tracking Program ("AT Program") of a User-Driven Menu Generation System (UDMGS) that tracks the processing of files. An example of a UDMGS is described in U.S. Pat. No. 7,320,007, the content of which is incorporated herein in its entirety.

To overcome the one or more of the forgoing limitations, there is provided, in accordance with a first aspect of one or more example embodiments, a system with dynamic generation of target files from template files for use by ordinary computer users. The system may comprise a program operable by an ordinary computer user and collections of template files and menu configuration files editable by system management personnel. This main program preferably includes a few different components, which may be written as parts of one large program, or may be subprograms or modules or routines or objects called by the main program. These components will now be briefly summarized.

The first component is operable by an ordinary computer user to select a folder or directory location where the new target file will reside and to select an operating system command or application program that will process this new target file. The component also offers the user an option to select a data repository such as but not limited to a file or a database table that tracts globally the user's activities of invoking operating system commands or application programs to process target files across the global folder structure or directory structure. The component also passes, in the background, the user-selected information to the other components.

The second component is operable by an ordinary user to receive prompting message from and enter data to a dynamically generated information exchange user interface such as but not limited to a dialog frame window on selecting a template file for a target file. For a new target file that is a text file and that is of a certain file type category, the component enables the users to readily create the initial version of the new target file from a template file that is selected by a user among previously created template files. For a target file to be of this category, only a relatively smaller number of fields in its content require changes over a period of time after its creation and the remaining unchangeable lines and unchangeable fields are known beforehand. For a new target file that is not a text file, the component enables the user to readily copy a previously created and user-selectable template file to the target file.

The third component is operable by an ordinary user to enter data for the changeable fields in the user-selected template file for a new target file that is a text file without knowing the internal structures of the template file and the target file. This component specifies a rule that identifies changeable fields, along with other rules specified by the conventions of the operating system command or application program that is to process the target file on the standard structure of the target file, on the layout of the internal structure of a template file. The component dynamically parses the internal structure of a template file created under these rules and extracts the identifications of the changeable fields and use these identifications as prompting labels to dynamically generate an information exchange user interface such as but not limited to a dialog frame window to prompt for and receive the inputs of a user for the data (fill-in values) of the changeable fields in the template file. The component, in the background, completes the task of generating the new target file by filling the changeable field locations with the fill-in values provided by the user.

The fourth component is operable by an ordinary user to readily include the invocations of operating system commands or application programs to process a new target file as new menu items in a user selected menu. The component also provides a graphics user interface to start the AutoGenMenu Program of the UDMGS system that displays menus selected by a user and invokes programs associated with menu items selected by a user. In addition the component also provides a graphic user interface for the Merge Program of the UDMGS system that merges any pair of user-selected folders or directories that contain target files or menus of similar functions such as but not limited to similar folders or directories created by co-workers that are deemed to be suitable candidates to be merged. The fourth component is also operable by an ordinary user to readily track the processing of newly generated target files by user-selected operating system commands or application programs in activity summary files for future references. The component also provides a graphics user interface for the Search Program of the UDMGS system to search for any number of character strings in the activity summary files for future references such as but not limited to serving as data repository for string searches.

In the target file generation system of an example embodiment, the third component is preferably operable to access at least a plurality of stored in the storage locations. These files preferably include template files stored in a designated folder or directory, at least one command map file and at least one menu configuration file. The template files are supposed to be created by personnel skilled in the internal structures of their layouts, such as but not limited to system management personnel, by following the rule of the structural layout specified by the system for this embodiment on the identification of changeable fields and by following the conventions of the operating system commands or application programs that are to process the target files on their structural layouts. The command map file is organized to store a plurality of operating system commands or application programs and a set of aliases used as a shortcut technique for referencing certain ones of the operating system commands or application programs. The menu configuration file is organized to store data that is a part of the process of creating and displaying a menu. These and other aspects of example embodiments may be further understood by referring to the detailed description below, accompanying Figures, and appended claims.

DETAILED DESCRIPTION OF PREFERRED EMBODIMENTS

Figure 1:
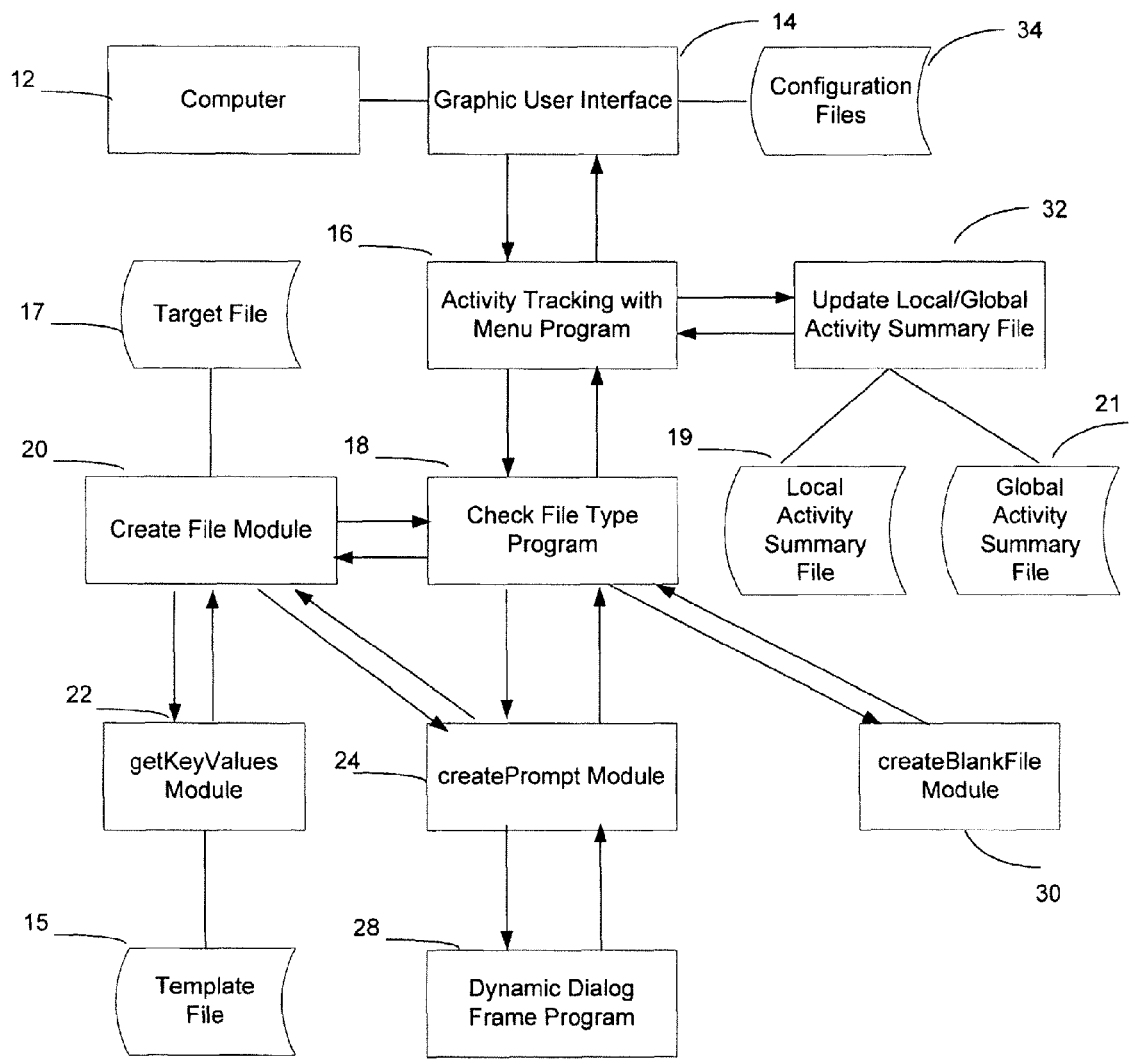
FIG. 1 illustrates the system diagram for the systems and methods of the embodiment.

The systems and methods of example embodiments of the present invention are illustrated and described herein in connection with certain embodiments, with the perception that the present disclosure is to be regarded as an exemplification of the various aspects and principles of the present invention and the associated example functional specifications utilized for their implementation. However, it should be appreciated that the systems and methods may be implemented in still different configurations, forms and variations, using other specifications, based on the understandings herein.

The example systems and methods typically may be used with and operate on and/or within an ordinary user's computer system. The examples of such computer systems are desktop computer, laptop or notebook computer, and/or computer workstation, whether used in a standalone fashion or as part of larger computer network that is required by the processing operating system or application program. The computer systems may be installed with any suitable operating system (OS), such as but not limited to Unix, Linux, Microsoft (MS) Windows or MS-DOS, Apple DOS, and the MAC OS for the Apple computer platforms. The example systems and methods may also be used in suitably personal digital assistants (PDA) or other computerized personal devices, including communication devices, such as digital cell phones, and computerized data collection devices, such as handheld data input devices including mobile logging of data, such as those used in various industries. Such portable PDA devices employ their own "light-weight" operating systems such as but not limited to the Palm OS from Palm Inc., Windows CE from Microsoft, and the Symbian OS designed for "mobile/wireless information devices" such as small, portable computer-based telephones, which are now providing with wireless access to phone and other information services, including short message services (SMS). The example systems and methods may also be used in software environments that operating broadband services and Consumer/Solar and Heliospheric Observatory (SOHO) satellite services.

In most current popular computer operating system platforms, such as UNIX/Linux or Microsoft Windows platforms, there are plenty examples of target files of the text file type that can be generated from suitable template files. Such examples include but not limited to WML (Wireless Markup Language) text files whose file names end with .wml and XML (Extensible Markup Language) text files whose file names end with .xml. Most commonly used WML files and XML files of various sizes contain many static tag name fields and static attribute name fields that stay unchanged. These files contain relatively smaller number of fields such as but not limited to data associated with the name values and attribute values that may require changes over a period of time. An optional benefit of certain of the example systems and methods is that it increases the productivities of ordinary users by many folds with its capability of dynamically generating WML and XML documents and thereby saving the manual efforts of the users. The capability involves with using templates with placeholders for the changeable fields. By extracting information of the placeholders, it dynamically prompts users to enter values for the changeable fields and then generates the target document.

The use of WML in wireless applications under the standard Wireless Application Protocol (WAP) is very similar to the use of Extensible Hypertext Markup Language (XHTML) for world wide web (WWW) applications. Wireless applications developed with WML are being deployed for wireless phones and PDA's. Certain example systems and methods dynamically update a new WML file with a template file and dialog windows, which are also dynamically generated. The function of a dialog window is to display relatively smaller number of but sufficient prompt messages that prompt users to enter either needed information for the WML file or data for the changeable fields in the template file. The systems and methods save ordinary users from reading through complex WML tag names to search for changeable fields in order to enter needed information or data.

XML is an emerging Internet standard that provides functionalities of those of the HTML and much more, for example, the functionalities that support Business-to-Business (B2B) Internet applications with database data wrapped by XML tags suitable for transmissions over the Internet. Certain example systems and methods dynamically update a new XML file with a template file and dialog windows, which are also dynamically generated. The function of a dialog window is similar to that for WML files described previously. That is, it is to display relatively smaller number of but sufficient prompt messages that prompt users to enter either needed information for the XML file or data for the changeable fields in the template file. The systems and methods save ordinary users from reading through complex XML tag names to search for changeable fields in order to enter needed information or data.

The example systems and methods include several programs or components of programs. It may be viewed as one large program with several smaller components depending upon how structured such component may run in a largely autonomous manner or may be more closely coupled or integrated with the other components.

FIG. 1 illustrates the system diagram for the computer environment in which the following four programs and four modules will be run. They are Graphics User Interface Program (box 14), Activity Tracking with Menu Program (box 16), Check File Type Program (box 18), Dynamic Dialog Frame Program (box 15), createFile module (box 20), getKeyValues module (box 22), createPrompt module (box 24), and createBlankFile module (box 30). These four programs and four modules implement the components of the systems and methods in the example embodiment.

Figure 2:
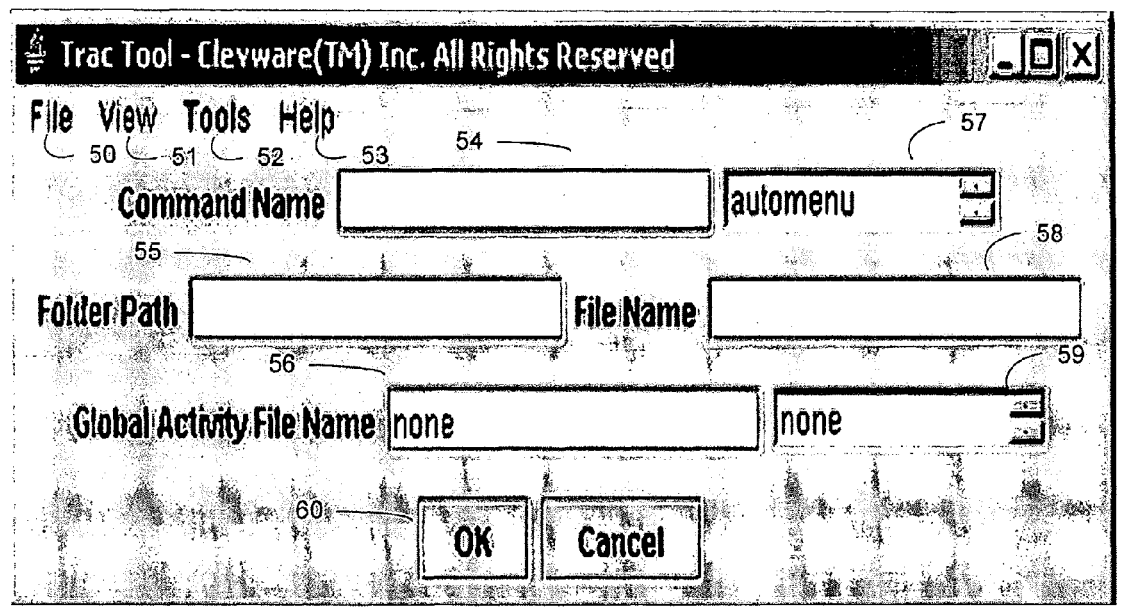
FIG. 2 illustrates the screen image displayed by the Graphics User Interface Program for the systems and methods of an example embodiment.

FIG. 2 illustrates the main screen displayed by the Graphics Users Interface Program (GUI Program). The GUI Program displays four menus: File (box 50), View (box 51), Tools (box 52), and Help (box 53) in the menu bar. It also displays four text boxes for command name (box 54), folder path (box 55), target file name (box 58), and name of global activity summary (logging) file (box 56) that accept users' input. In addition the GUI Program reads the list of names of operating system commands and application programs from a configuration file (box 34 in FIG. 1) and displays a drop down box (box 57) containing these names. If a user selects a program name from this drop down box, then the GUI Program displays the name in the command name box on box 54. The GUI Program also reads the list of names of global activity summary files from the same configuration file (box 34 in FIG. 1) and displays a drop down box (box 59) containing these names. If a user selects a name of a global activity summary file from this drop down box, then the GUI Program displays the name in the global activity summary box on box 56. The File menu in box 50 contains but not limited to the menu item: Open. If a user wants to select a target file to be processed by a command, the user can click on the File menu and click the Open menu item to bring up a File Dialog Window, which is depicted in FIG. 3 whose description is followed next.

Figure 3:
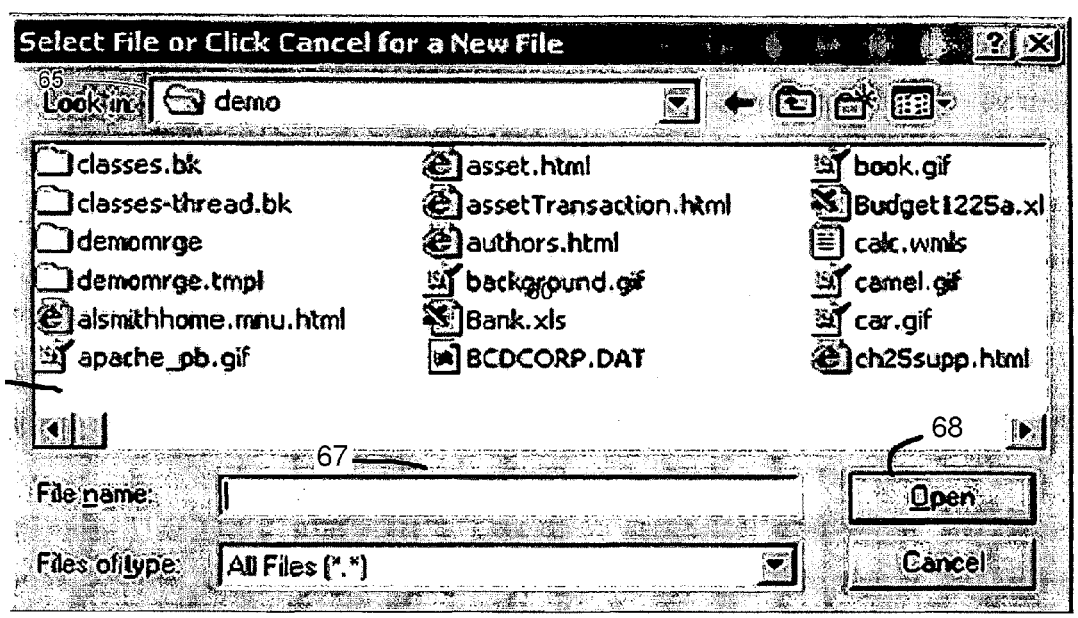
FIG. 3 illustrates an opened file dialog window if a user clicks the File menu on the menu bar on FIG. 2 and then clicks the menu item: Open.

FIG. 3 illustrates the File Dialog Window. A user may select a folder (directory) in which to create a new target file or select an existing target file. Box 65 displays the path name of the folder. Box 66 displays the sorted list of all the files and subfolders (subdirectories) of the selected folder. If the user wants to create a new target file, then the user types in the name of the target file in box 67. If the user wants to select an existing target file in the list displayed in box 66 to process, then the user clicks the name of the target file to get it displayed in box 67. After the user fills the box 67 with the name of the target file, then the user clicks the Open button to confirm to the GUI Program of the selection the target file name. The GUI Program then fills the box of the target file name, box 58 of FIG. 2, with the user selected target file name. The user next fills the box 54 of FIG. 2 with the name of the program that is to process the target file. If the user wants to track (log) the processing of the target file, then the user also fills the box 56 of FIG. 2 with the name of a global activity summary file. For a more comprehensive coverage, for the rest of this document, it is assumed that box 56 of FIG. 2 is filled with the name of a global activity summary file because the methods for the case of not tracking the processing of the target files form a subset of the methods for the case of tracking the processing of the target files. After the user clicks the OK button in box 60 of FIG. 2, the GUI Program starts the Activity Tracking with Menu Program, which is depicted in FIG. 4 whose description is followed next.

Figure 4A:
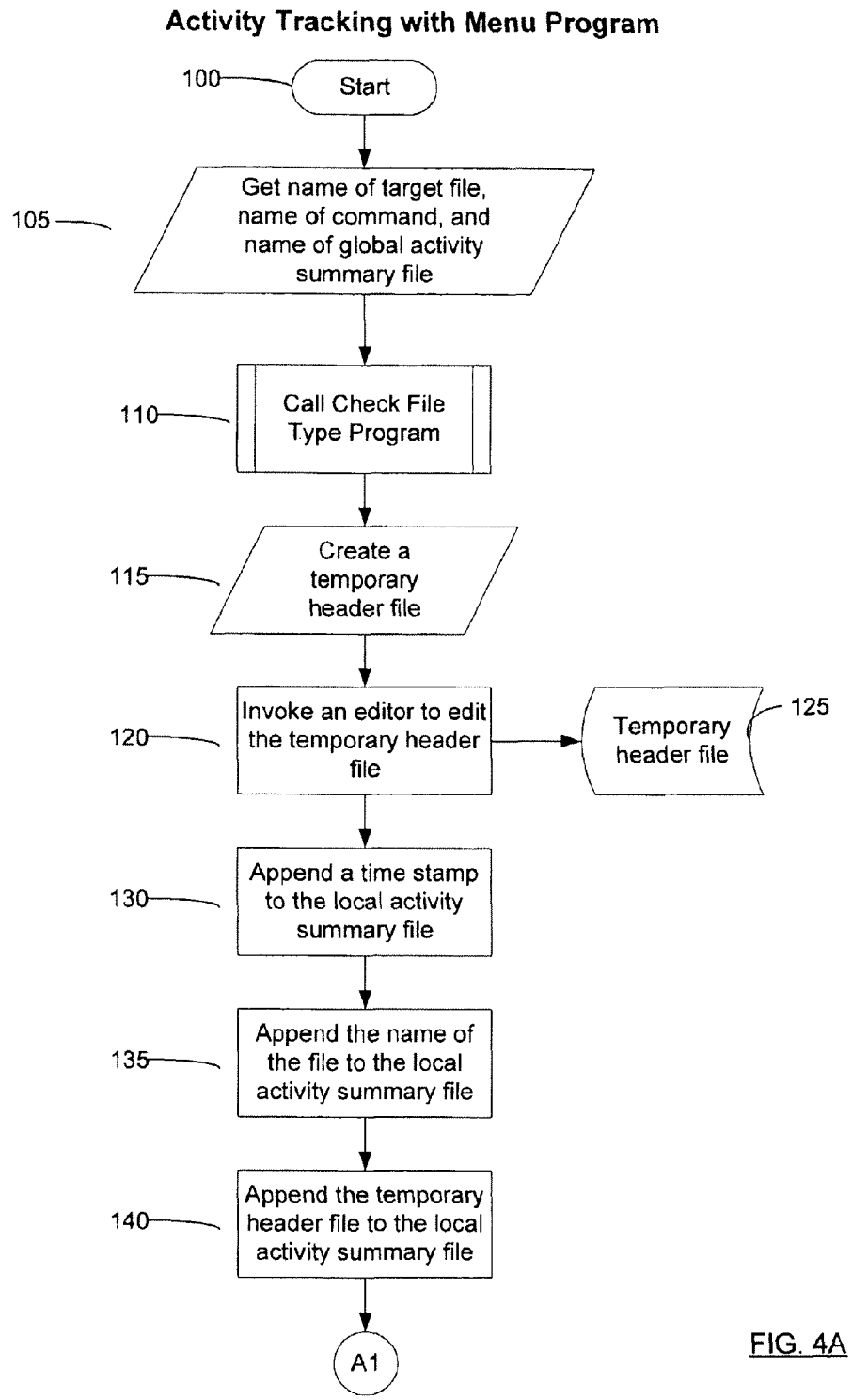
FIG. 4A-B is a flow chart that illustrates the steps of the Activity Tracking with Menu Program. This program enhances the Activity Tracking Program (AT Program) of the UDMGS system. The program starts the tracking of the processing of a file resource by an application program.
Figure 4B:
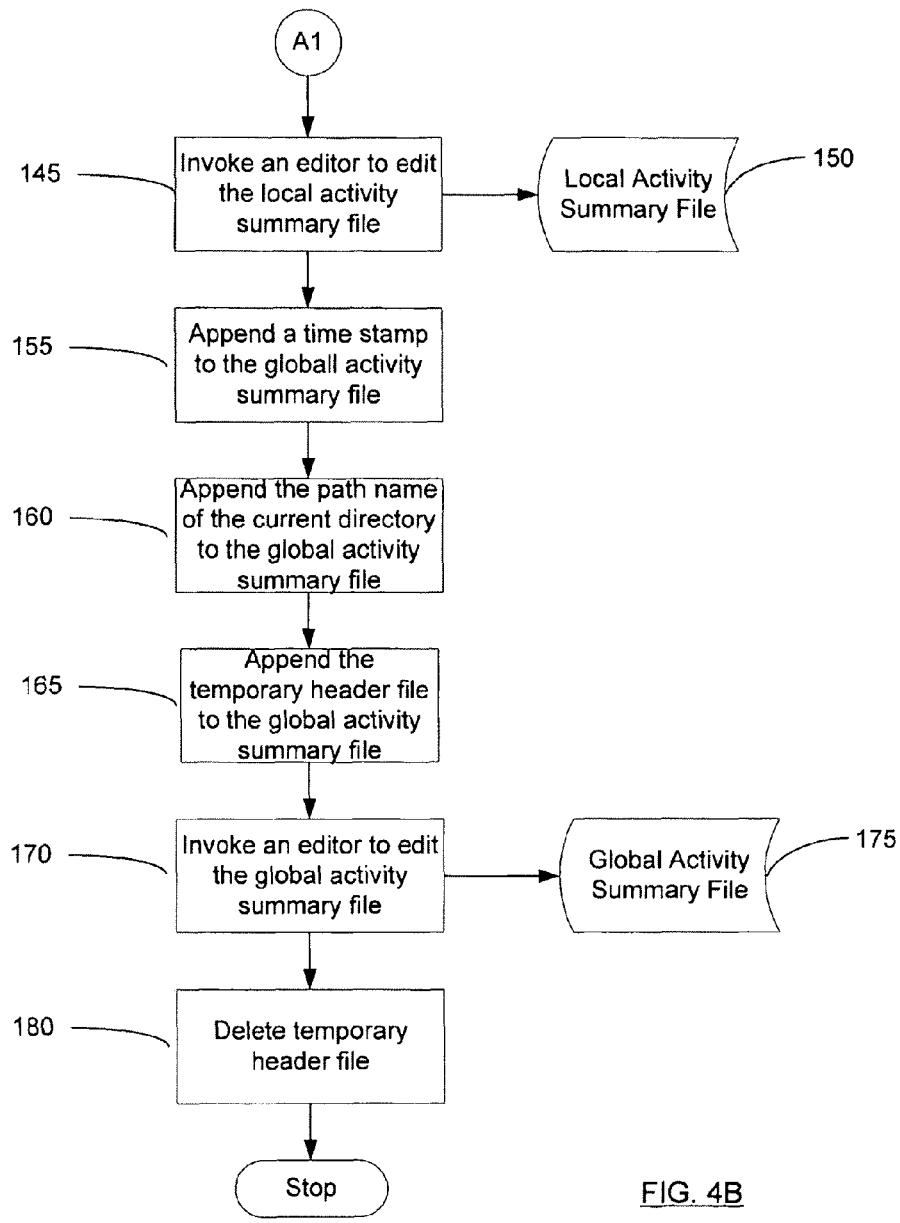

FIG. 4, comprised of FIG. 4A and FIG. 4B, illustrates the Activity Tracking with Menu Program (ATWM Program). This program enhances the Activity Tracking Program (AT Program) of the UDMGS system. At block 105, the ATWM Program receives from the GUI Program the name of the target file, the name of the command (program) that is to process the target file, and the name of the global activity summary file. The processing of the target file includes but not limited to creation, or editing, or viewing. At block 110, it calls the Check File Type Program. If the target file is an existing file, the Check File Type Program invokes the corresponding command to process it. After the call to the Check File Type Program is returned, in blocks 115 to 180 the ATWM Program invokes a component of the AT program to log the processing of the target file to the local activity summary file and the global activity summary file; or local activity summary table and global activity summary table if Relational Database Management System (RDBMS) is used. For each target file the folder that contains it corresponds to exactly one local activity summary file (or local activity summary table). As is shown in boxes 56 and 59 of FIG. 2, there are many global activity summary files (or global activity summary tables.) An object data model that prescribes the rules of the design and implementation of local activity summary tables and global activity summary tables in RDBMS will be described in FIG. 14. The description of how the Check File Type Program handles the case that the target file is new is followed next.

Figure 5A:
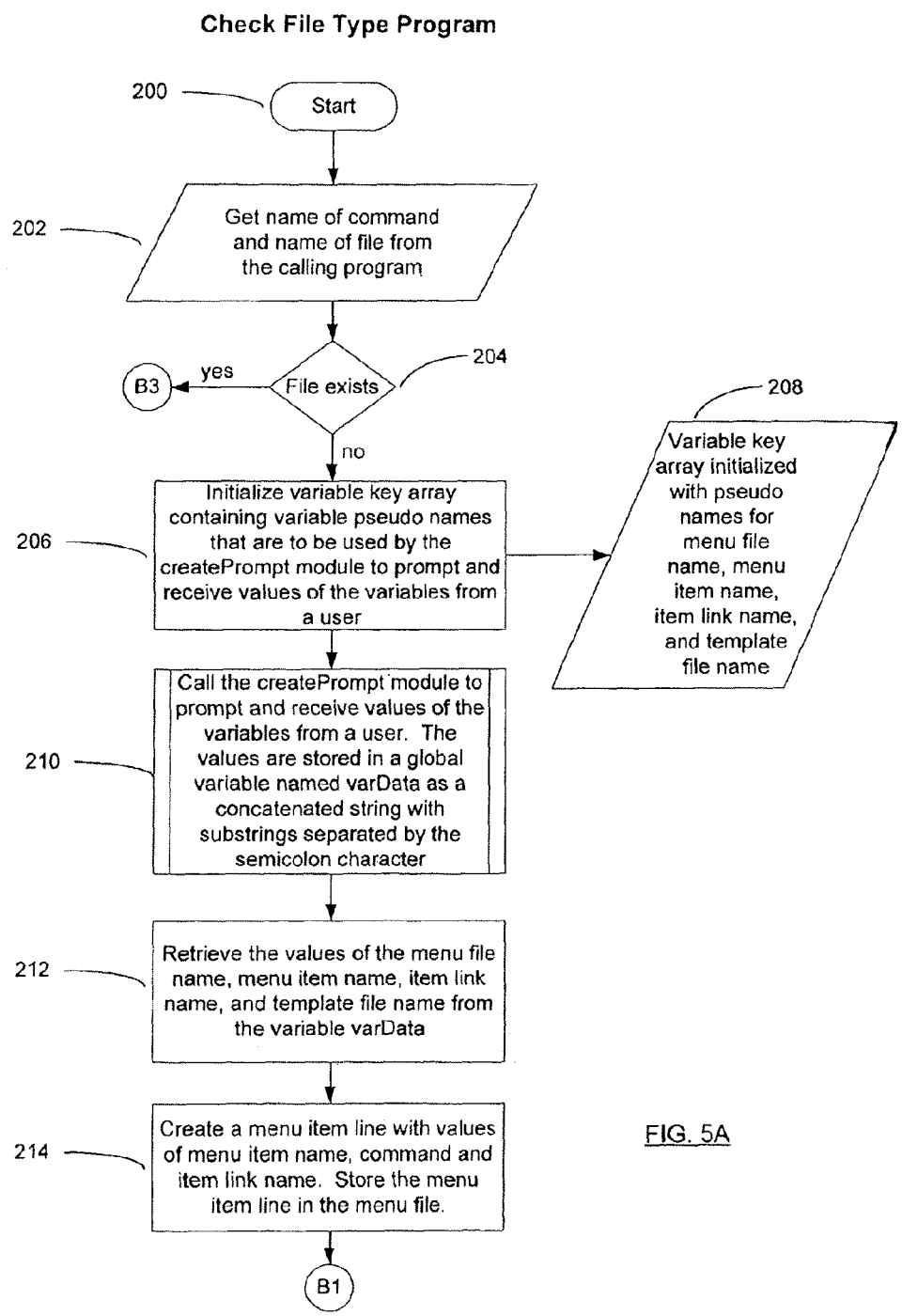
FIG. 5A-C is a flow chart that illustrates the steps of the Check File Type Program. This program performs tasks or calls other modules in generating target files from template files and invokes a user-selected application program to process the new target file.
Figure 5B:
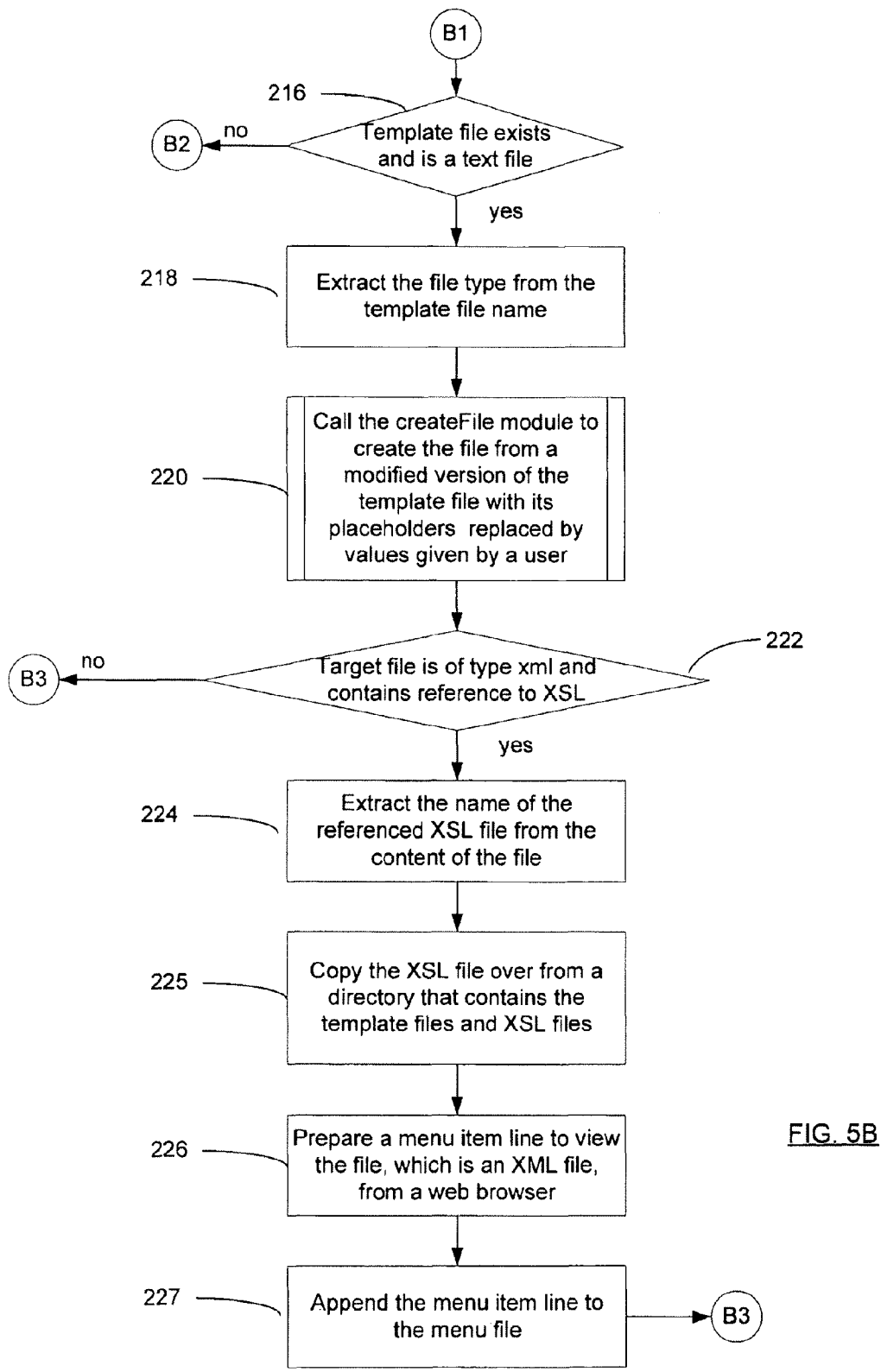

FIG. 5 illustrates the Check File Type Program (CFT Program). At block 202, the CFT program receives the name of the target file and the name of the command from the ATWM Program. At block 204, it determines whether the target file exists or note. If the target file exists, at block 234 the CFT Program invokes the command to process the file. If the target file is a new file and thus does not exist, at block 206 the CFT Program initializes a variable key array containing variable pseudo names that are to be used by the createPrompt module to prompt and receive values of the variables from a user. As is illustrated in block 208, the CFT Program initializes the variable key array with pseudo names for menu file name, menu item name, item link (reference) name, and template file name. At block 210, it calls the createPrompt module to prompt and receive values of the variables from a user. The values are stored in a global variable named varData as a concatenated string with substrings separated by the semicolon character. At block 212, the CFT Program retrieves the string values of the menu file name, menu item name, item link name, and template file name from the variable varData. At block 214, the CFT Program appends a line that consists of string of the name of the menu item, the string of the name of the processing command concatenated with the string of the target file name as its argument, and the string of the link name to the end of the Menu Configuration file.

At block 216, the CFT Program determines whether the template file exists and is a text file. If the template file does not exist or is not a text file, at block 228 it checks whether the template file exists and is not a text file. If yes, then it copies the template file to the target file at block 230 and invokes the command to process the target file at block 234. If no, which implies that the template file does not exist, at block 232 it calls the createBlankFile Module to optionally copy a suitable default file to the target file and invokes the command to process the target file at block 234. Depending on the type of the target file, examples of the default file include but not limited to empty word processing file, spreadsheet file, and presentation file. If the template file exists and is a text file, at block 218 the CFT Program extracts the file type from the template file name. At block 220, the CFT Program calls the createFile module to create the target file from a modified version of the template file with its placeholders replaced by values given by a user. At block 222, the CFT Program checks whether the target file is of the type XML and the target file contains a reference to XSL. If it is not the case, at block 234 the CFT Program invokes the command to process the target file. If it is the case, at block 224 it extracts the name of the referenced XSL file from the content of the target file. At block 225, it copies the XSL file over from a predetermined default folder that contains the XSL file. At block 226, the CFT Program prepares a menu item line to view this XML file from a web browser. At block 227 it appends this menu item line to the menu file identified at block 212. At block 234, the CFT Program invokes the command to process this XML file. After considering all cases, at block 236 the CFT Program checks whether the target file is a WML file. If it is, at block 238 the CFT Program copies the target file to the virtual document directory of the web server to be viewed by wireless devices and returns to the calling ATWM Program. If it is not, the CFT Program returns directly to the calling ATWM Program.

In the ATWM Program, after the call to the CFT Program is returned for the case that the target file is new, in blocks 115 to 180 the ATWM Program invokes a component of the AT program to log the processing of the target file to the local activity summary file and the global activity summary file; or local activity summary table and global activity summary table if Database Management System (DBMS) is used As was described previously the first module that the CFT Program calls is the createPromt module if the target file does not exist. FIG. 6, comprised of FIG. 6A, FIG. 6B, and FIG. 6C illustrates the createPrompt module. The cratePrompt module receives from the calling program or module a variable key array that it will use to create a program that displays a dialog window to prompt a user to enter inputs for the variables identified in the variable key array. Examples of such variable key arrays include but not limited to that described in block 208 of FIG. 5. In this case, the variable key array is initialized in the CFT Program with pseudo names for menu file name, menu item name, item link name, and template file name. An optional array element that represents a pseudo name such as "only copying template file" indicating whether the template file should be directly copied to the target file or not may be added to the end of the variable key array. The createPrompt module creates a program that will display a dialog window to prompt a user to enter input values for menu file name, menu item name, item link name, and template file name. In general, at block 302, the createPrompt module opens the Dialog Frame Pseudo Program file for input. As is described in block 304, the Dialog Frame Pseudo Program is an incomplete software program containing placeholders for variable names, number of window panels, and height of window frame, respectively. Examples of programming languages that can be used to implement the software program include but not limited to Java, C#, or C++. An example, implemented in Java, for a line that contains placeholders for variable names is String label#varName#Str="#varName#".replace('_', ' ');

where #varName# is the placeholder for variable name. At block 306, the createPrompt module opens the Dynamic Dialog Frame Program file for output. As is described in block 308, if the Dynamic Dialog Frame Program file exists, then it will be overwritten. An execution of the resulting Dynamic Dialog Frame Program will display a dialog window to prompt users for inputs and to collect them and return them to the calling module. At block 310, the createPrompt module calculates the value of the len variable as the size of the variable key array plus 1 (counting the OK button object at the bottom of the dialog frame). At block 312, it calculates value of the height variable as the product of the len variable with a preset height for a dialog panel.

From block 314 to 332, the createPrompt module contains a program loop that reads the file of the Dialog Frame Pseudo Program line by line, makes changes to each line if necessary or makes no change, and appends the changed or unchanged line to the file of the Dynamic Dialog Frame Program. At block 314, the createPrompt module reads the first line of the Dialog Frame Pseudo Program. At block 316, it checks whether the end of the Dialog Frame Pseudo Program file is reached. If yes, then at block 334 it invokes the compiler command from the operating system platform to compile and link the Dynamic Dialog Frame Program file to an executable program file. If no, then at block 318, the createPrompt module checks whether the input line from file of the Dialog Frame Pseudo Program contains placeholders for the variable name. If the input line contains one, then at block 320 the createPrompt module replaces the placeholders by the corresponding value of the element of the variable key array and appends the new lines to the Dynamic Dialog Frame Program file, and at block 332 it reads the next line of the Dialog Frame Pseudo Program file and returns to block 316 for the next iteration in the loop. As was described earlier, an example, implemented in Java, for a line that contains placeholders for variable names is String label#varName#Str="#varName#".replace('_', ' ');

where #varName# is the placeholder for variable name. Examples of the new lines resulted from replacing the placeholders by corresponding value of the element of the variable key array are String labelMenu_File_NameStr="Menu_File_Name".replace('_', ' ');
String labelMenu_Item_NameStr="Menu_Item_Name".replace('_', ' ');
String labelLink_NameStr="Link_Name".replace('_', ' ');
String labelTemplate_File_NameStr="Template_File_Name".replace('_', ' ')
String labelOnly_Copying_Template_FileStr="Only_Copying_Template_File".replace('_', ' ')

If the input line contains no placeholder for the variable name, at block 322 the createPrompt module checks whether the line contains a placeholder for the number of window panels. If the input line contains one, then at block 324 the createPrompt module replaces the placeholder by the value of the len variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the number of window panels is container.setLayout(new GridLayout(#varCount#, 1));

where #varCount# is the placeholder for the number of window panels. An example of the new line resulted from replacing the placeholder by the value of the len variable is container.setLayout(new GridLayout(6, 1));

If the input line contains no placeholder for the number of window panels, at block 326 the createPrompt module checks whether the line contains a placeholder for the height of the window frame. If the input line contains one, then at block 328 the createPrompt module replaces the placeholder by the value of the height variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the height of the window frame is setSize(350, #1stHeight#);

where #1stHeight# is the placeholder for the height of the window frame. An example of the new line resulted from replacing the placeholder by the value of the height variable is setSize(350, 210);

If the input line contains no placeholder for the height of the window frame, at block 330 the createPrompt module appends the input line without any change to the Dynamic Dialog Frame Program file, and at block 332 it reads the next line of the Dialog Frame Pseudo Program file and returns to block 316 for the next iteration in the loop. After all the lines of the Dialog Frame Pseudo Program file are read with corresponding changed or unchanged lines appended to the Dialog Frame Pseudo Program file, the Dialog Frame Pseudo Program file becomes a complete program file. At block 334 the createPrompt module invokes the compiler command from the operating system platform to compile and link the Dynamic Dialog Frame Program file to an executable program file. At block 336, it executes the executable program file and stores the output in the global variable named var-Data. As is described in block 338, this output contains a string of the user input for all text field objects on the dialog frame window created by the execution of the executable Dynamic Dialog Frame Program file. In the string, the user's input for two adjacent text field objects are separated by a delimiter character such as but not limited to the semicolon character. A more detailed description of the Dynamic Dialog Frame Program is followed next.

Figure 7A:
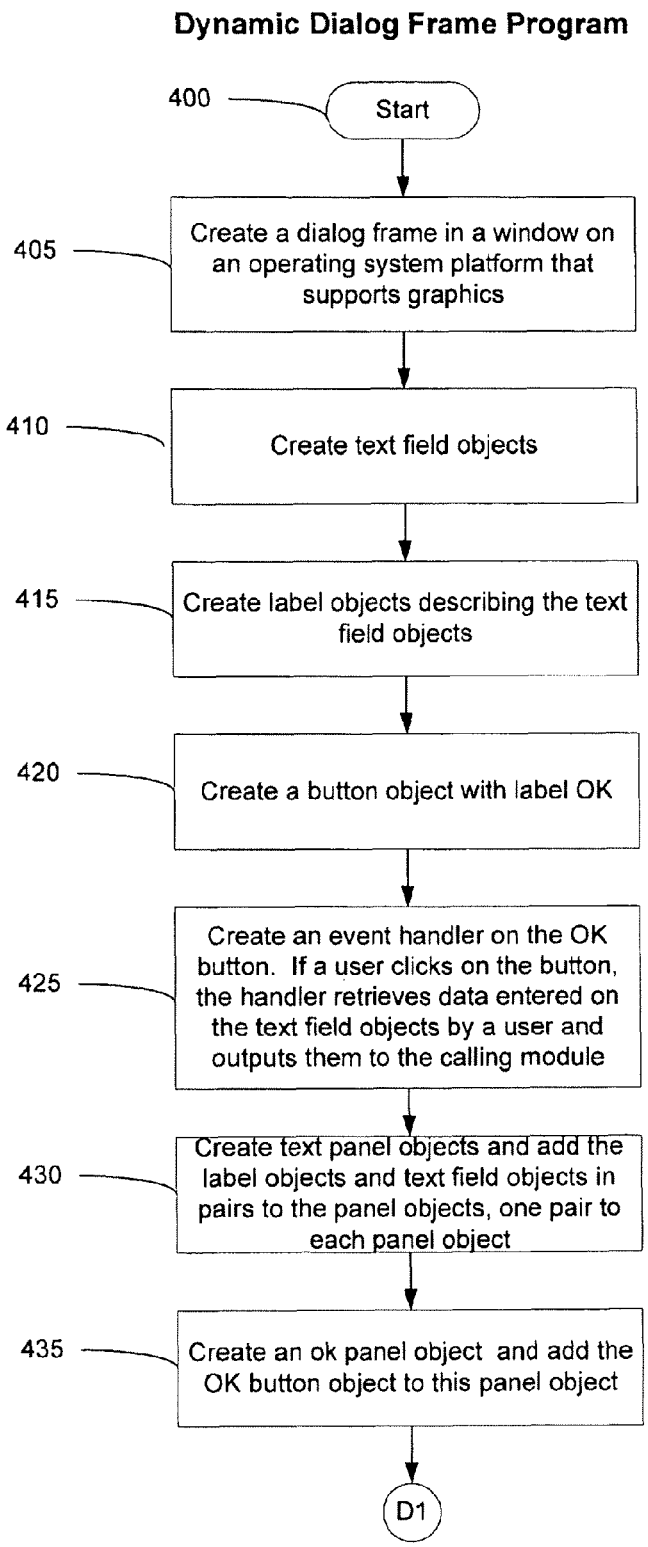
FIG. 7A-B is a flow chart that illustrates the steps of the Dynamic Dialog Frame Program. The program generates a dialog frame window on an operating system platform that supports graphics. The dialog frame prompts a user to enter values for its text field objects.
Figure 7B:
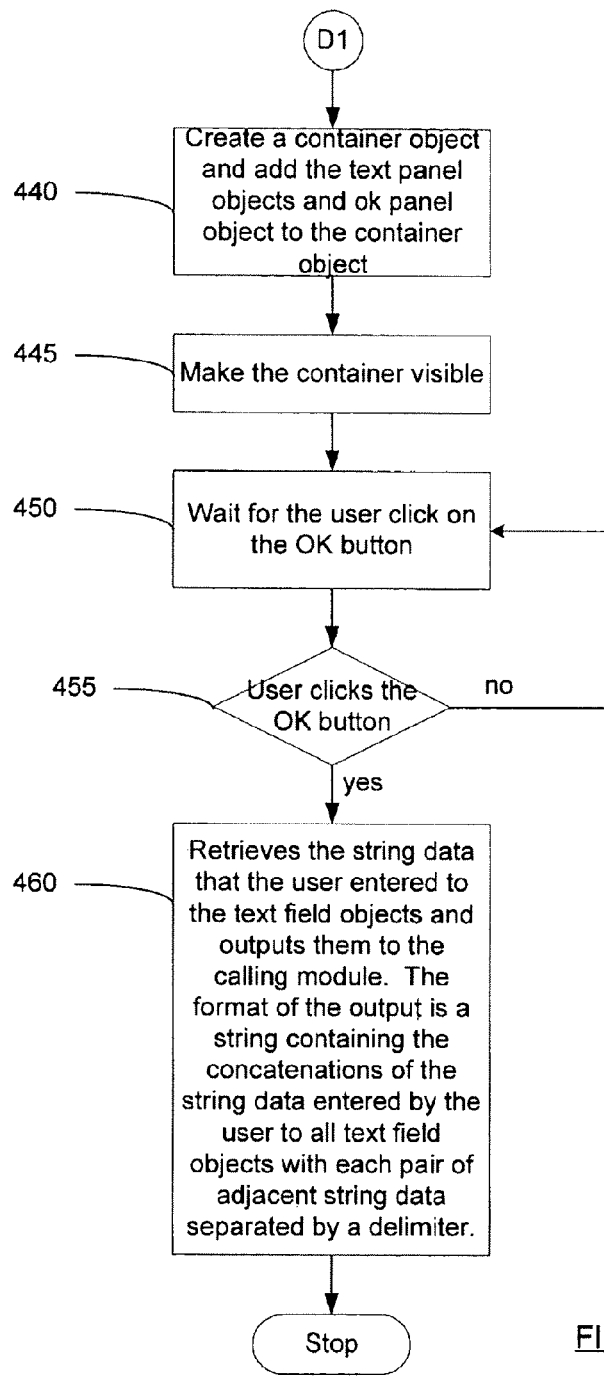

As was described previously the main function of the createPrompt module is to generate an executable Dynamic Dialog Frame Program file, execute it to display a dialog window to collect users' input, and store them in the global variable named varData. FIG. 7, comprised of FIG. 7A and FIG. 7B, illustrates the Dynamic Dialog Frame Program (DDF Program). At block 405, the DDF Program creates a dialog frame window on an operating system platform that supports graphics. At block 410, it creates text field objects. At block 415, it creates label objects describing the text field objects. At block 420, it creates a button object with label OK. At block 425, the DDF Program creates an event handler on the OK button such that if a user clicks on the button, this event handler retrieves data entered on the text field objects by a user and outputs them to the calling module. At block 430, it creates text panel objects and adds the label objects and text field objects in pairs to the panel objects, one panel object for each pair. At block 435, it creates an ok panel object and adds the OK button object to this panel object. At block 440, the DDF Program creates a container object and adds the text panel objects and ok panel object to the container object. At block 445, it makes the container object visible. At blocks 450 and 455, it waits for the user to enter data to the text field objects and clicks the OK button. After the user clicks the OK button, at block 460 the DDF Program retrieves the string data that the user entered to the text field objects and outputs them to the calling module. The format of the output is a string containing the concatenations of every string data entered by the user to each text field object with each pair of adjacent string data separated by a delimiter such as but not limited to the semicolon character.

Figure 8:
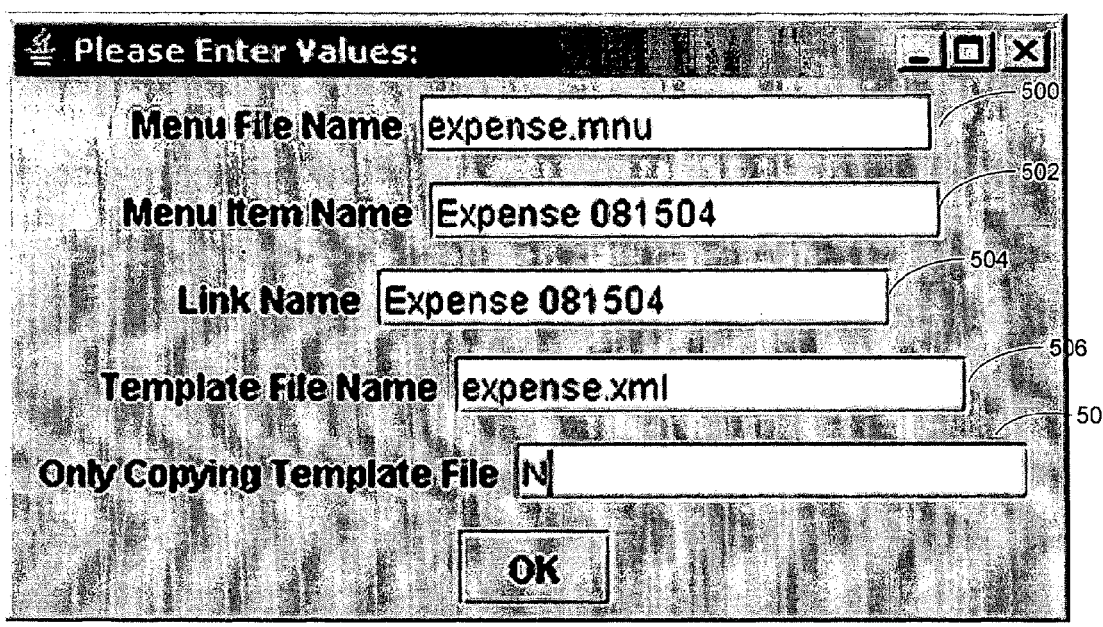
FIG. 8 illustrates the screen image of a dialog frame window created by executing a Dynamic Dialog Frame Program for the purpose of prompting for and collecting user input for menu related information and optionally for the name of a template file.

As was described previously, at block 210 of FIG. 5, the CFT Program calls the createPrompt module to prompt a user to enter string values for the menu file name, menu item name, item link name, and template file name. At block 336 of FIG. 6 the createPrompt module in turn executes the executable DDF Program file and stores the user's inputs for the string values in the global variable named varData. At block 212 of FIG. 5, the CFT Program retrieves the string values of the menu file name, menu item name, item link name, and template file name from the string value of the global variable varData. As was discussed previously an optional prompt message for "only copying template file" that requests the user to answer with Y (yes) or N (no) indicating whether the template file should be directly copied to the target file or not may be added to the dialog window displayed by the execution of an executable DDF Program file, which is generated at block 336 of FIG. 6, and the user's answer is added to the end of the string value for the variable varData. FIG. 8 illustrates such a dialog window. At block 500, the DDF Program displays the text field object for the menu name. At block 502, it displays the text field object for the menu item name. At block 504, it displays the text field object of the item link name. At block 506, the DDF Program displays the text field object of the template file name. At block 508, it displays the text field object that receives the user's answer to the prompt "Only Coping Template File".

Figure 9A:
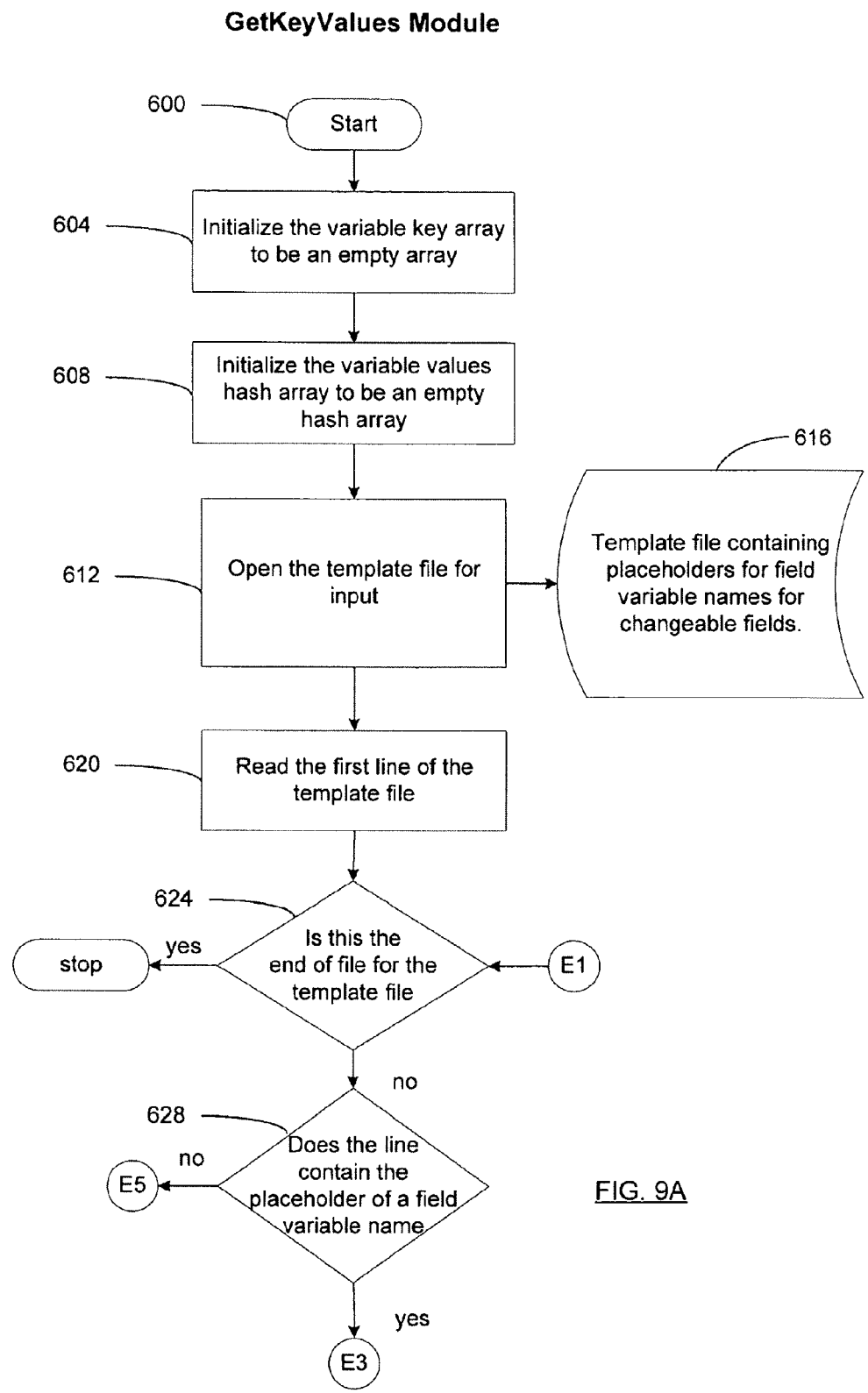
FIG. 9A-B is a flow chart that illustrates the steps of the getKeyValues module. The module extracts filed variable names (or identifications) from the placeholders in a template file.
Figure 9B:
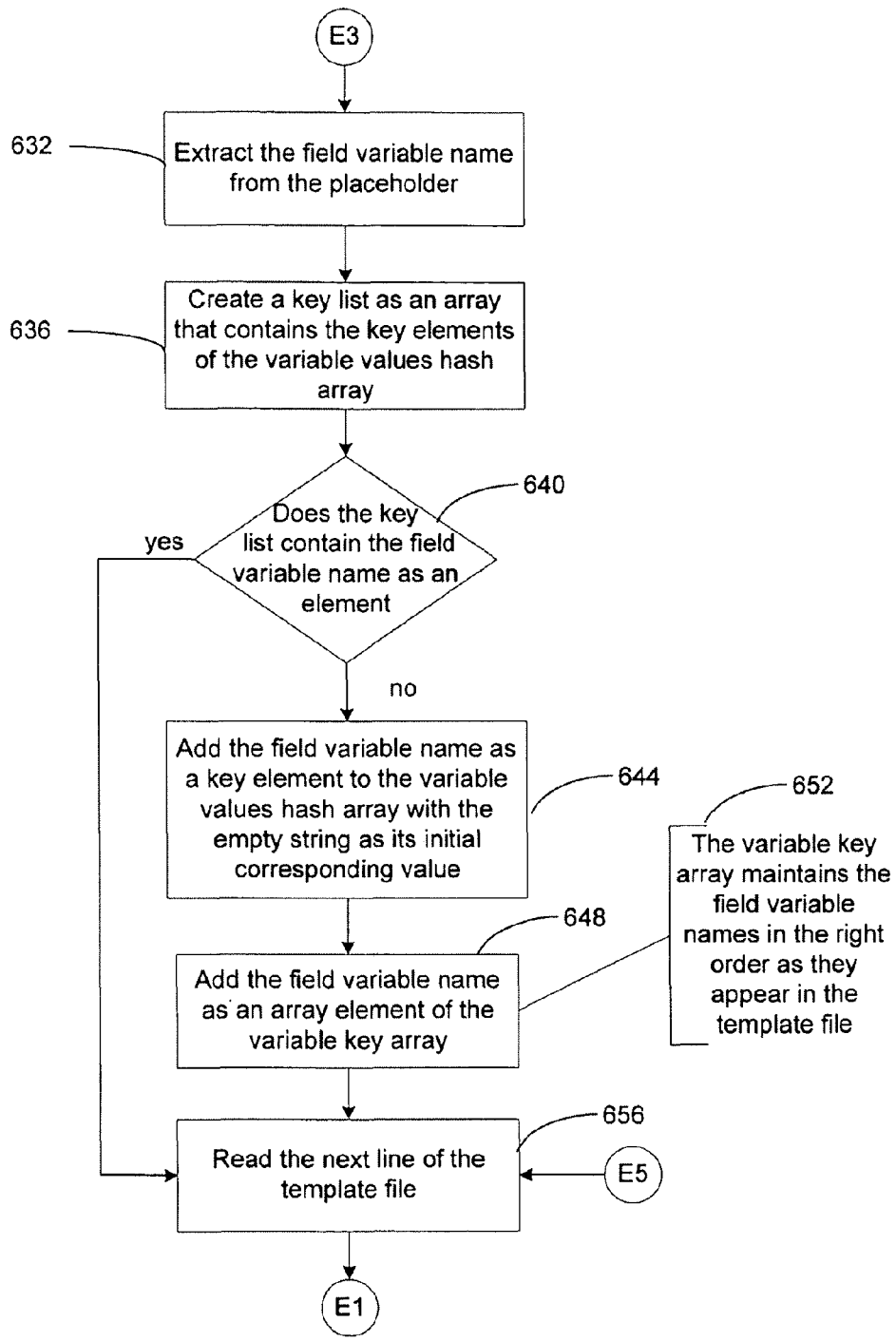

As was discussed in the description for FIG. 5, the second module that the CFT Program calls is the createFile module if the target file does not exist and if the template file exists and is a text file. As is shown in boxes 20 and 22 of FIG. 1, the only module that the createFile module calls is the getKeyValue module. At this point, the description of the getKeyValue module is presented next and the description of the createFile module will be presented following it. FIG. 9, comprised of FIG. 9A and FIG. 9B, illustrates the getKeyValue module. In block 604, the getKeyValue module initializes the global variable key array to be an empty array. In block 608, it initializes the global variable values hash array to be an empty hash array. As is shown in boxes 22 and 15 of FIG. 1, and in block 612, the getKeyValue module opens the template file for input. As is described in box 616, the template file contains placeholders with field variable names (or identifications) for changeable fields. Before the further description of the getKeyValue module, changeable fields and placeholders in a template file are described in more details next.

A changeable field of a template file is named from an internal point of view. It has a field variable name and identifies a field location in the template file. All changeable fields need to be replaced to transform the template file to a real document. A placeholder of a template file is named from an external point of view. Placeholders are ways to represent the changeable fields so that a computer program can be developed to detect them and replace them. The following is an example of a template file in its simplest form for a travel expense report:

| | |
|---|---|
| Employee | ==name== |
| Date | ==date== |
| Client | ==client name== |
| Meals | ==meals cost== |
| Gas | ==gas cost== |

The five fields on the left side are unchangeable fields. They represent the static structure of the document in the form of but not limited to plain alphanumerical strings. For example, static tag names of XML or WML may also appear on the left side. The five fields on the right side are changeable fields. They identify the field locations that need to be replaced. Placeholders are ways of representing changeable fields. Here there are five placeholders on the right side, representing the filed variable names (or identifications) preceded by but not limited to == (two=characters) and trailed by ==. For example, ==name== is a placeholder and name is a field variable name. There are other ways to represent the five fields such as using ** instead of ==. Placeholder values (or fill-in values) are the user input values that replace the changeable fields to transform the template file to a real document, which represents the initial version of the target file. A more complex example of a template file such as but not limited to XML file format may contain a line with static tag and placeholder like:

<empName value="==var==Name==evar=="/>

In the above example, field variable names (or identifications) are preceded by the character string "==var==" and followed by the character string "==evar==".

From blocks 620 to 656 of FIG. 9A and FIG. 9B, respectively, the getKeyValue module contains a program loop that reads the template file line by line. At block 620, it reads the first line. At block 624, it checks whether the end of the template file is reached. If yes, then it returns to the caller. If no, then at block 628 it checks whether the line contains the placeholder of a field variable name (or identification). If the line does not contain any placeholder, then at block 656 the getKeyValue module reads the next line of the template file. If the line contains the placeholder of a filed variable name, then at block 632 the getKeyValue module extracts the string value of the field variable name from the placeholder on the line. (The discussion here is for at most one placeholder per line. But the approach of the method is not limited to it.) At block 636 it creates a key list as an array that contains the key elements of the variable values hash array. At block 640 it checks whether the key list contains the string value of the field variable name as an element. If yes, then at block 656 it reads the next line of the template file. If no, then at block 644 it adds the string value of the field variable name as a key index element to the variable values hash array with the empty string as its initial corresponding value. At block 648 the getKeyValue module adds the string value of the field variable name as an array element of the variable key array. As is commented in box 652, the variable key array contains the string values of the filed variable names (or identifications) as its array elements in the right order as they appear in the template file. At block 656, getKeyValue module reads the next line in the template file.

Figure 10A:
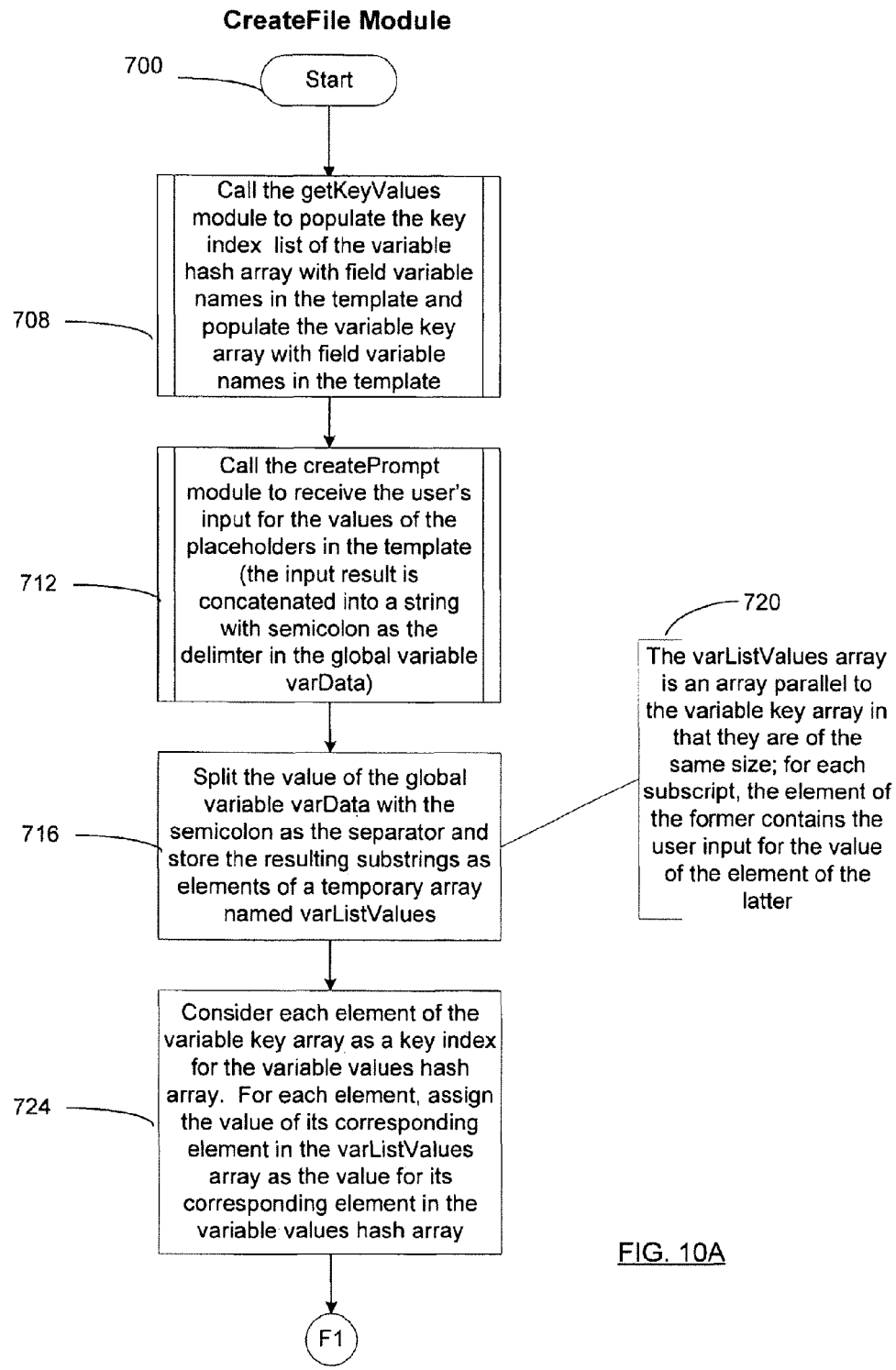
FIG. 10A-C is a flow chart that illustrates the steps of the createFile module. The module performs the task of generating the target file from a template file and from input data entered by a user on a dynamically generated dialog frame window.
Figure 10B:
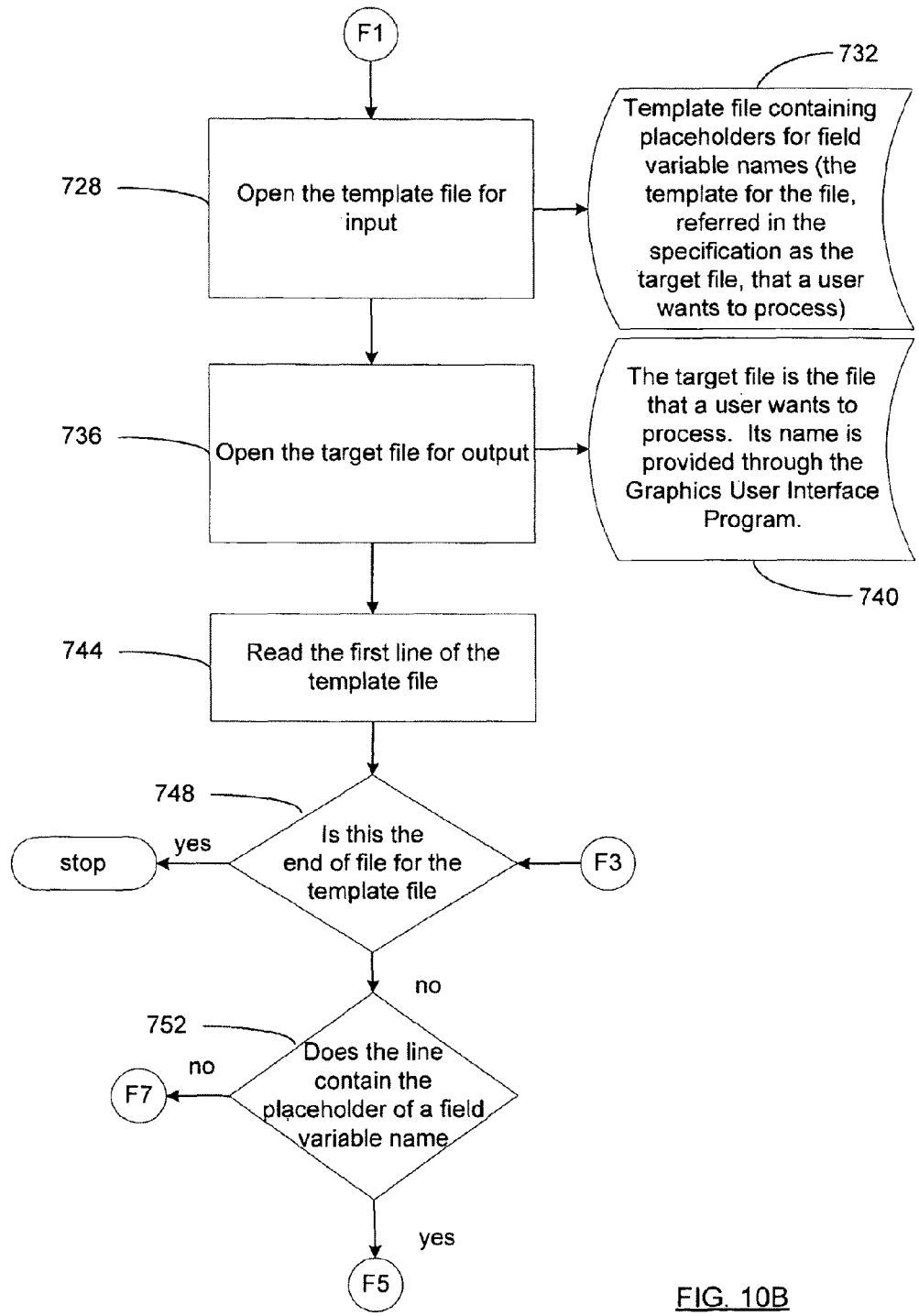
Figure 10C:
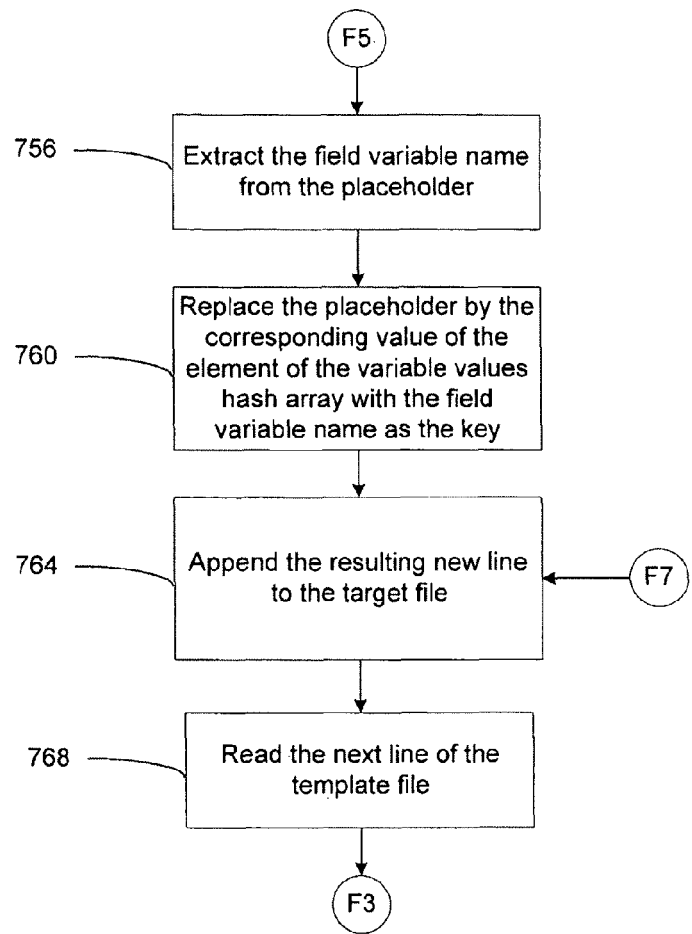

As was discussed before, the second module that the CFT Program calls is the createFile module if the target file does not exist and if the template file exists and is a text file. As was also discussed before, the description of the createFile module follows the description of the getKeyValue module, which was just presented. FIG. 10, comprised with FIG. 10A, FIG. 10B, and FIG. 10C, illustrates the createFile module. At block 708 the createFile module calls the getKeyValues module to calls the getKeyValues module to populate the key index element list of the variable hash array with the string values of the filed variable names (or identifications) in the template and populate the variable key array with the same string values of the filed variable names (or identifications) in the template. At block 712 it calls the createPrompt module to display a dialog window with the string values of the filed variable names (or identifications) as labels and prompt for and receive the user's input for the placeholders' values in the template. It concatenates the placeholders' values into a single string with each pair of adjacent placeholder values (or fill-in values) being separated by a delimiter character such as the semicolon character ";" in the global variable varData. At block 716 the createFile module splits the value of the global variable varData with the semicolon character ";" as the separator and stores the resulting substrings as elements of a temporary array named varListValues. As is commented in the box 720, the varListValues array is an array parallel to the variable key array, which, as can be recalled, was populated with string values of the template file's filed variable names (or identifications) as its array elements by the getKeyValue module, in that they are of the same size. For each subscript, the element of the varListValues array contains the user input value for the value of the placeholder in the template file that corresponds to the element of the variable key array, which is the string value of a variable key name. At block 724, the createFile module considers each element of the variable key array as a key index for the variable values hash array. For each element of the variable key array, it assigns the value of its corresponding element in the varListValues array as the value for its corresponding element in the variable values hash array. Thus the variable values hash array contains the key-value pairs in that each key index contains the string value of a field variable name and that the corresponding value is the user's input value that replaces the placeholder at the location of the field variable in the template file.

At block 728, the createFile module opens the template file for input. As was discussed in the description for FIG. 9 for the getKeyValue module at box 616 and as is commented in box 732, the template file contains placeholders at the locations of filed variable names (or identifications) representing changeable fields. At block 736, the createFile module opens the target file for output. As is commented in box 740, the target file is the file that a user wants to process. Its name is provided through the Graphics User Interface Program. From block 744 to block 768, the createFile module contains a program loop that reads the template file line by line. At block 744, it reads the first line of the template file. At block 748, it checks whether the end of the template file is reached. If yes, then it returns to the calling module. If no, then at block 752, it checks whether the line contains the placeholder of a field variable name. If the line does not contain the placeholder of a field variable name, then at block 764 it appends the line unchanged to the target file. At block 768 it reads the next line from the template file and returns to block 748 to check whether the end of the template file is reached. If the line does contain the placeholder of a field variable name, then at block 756 the createFile module extracts the field variable name from the placeholder. At block 760 it creates a new line by replacing the placeholder by the corresponding value of the element of the variable values hash array with the extracted field variable name as the key index. At block 764 it appends this new line to the target file. At block 768 it reads the next line from the template file and returns to block 748 to check whether the end of the template file is reached.

Figure 11:
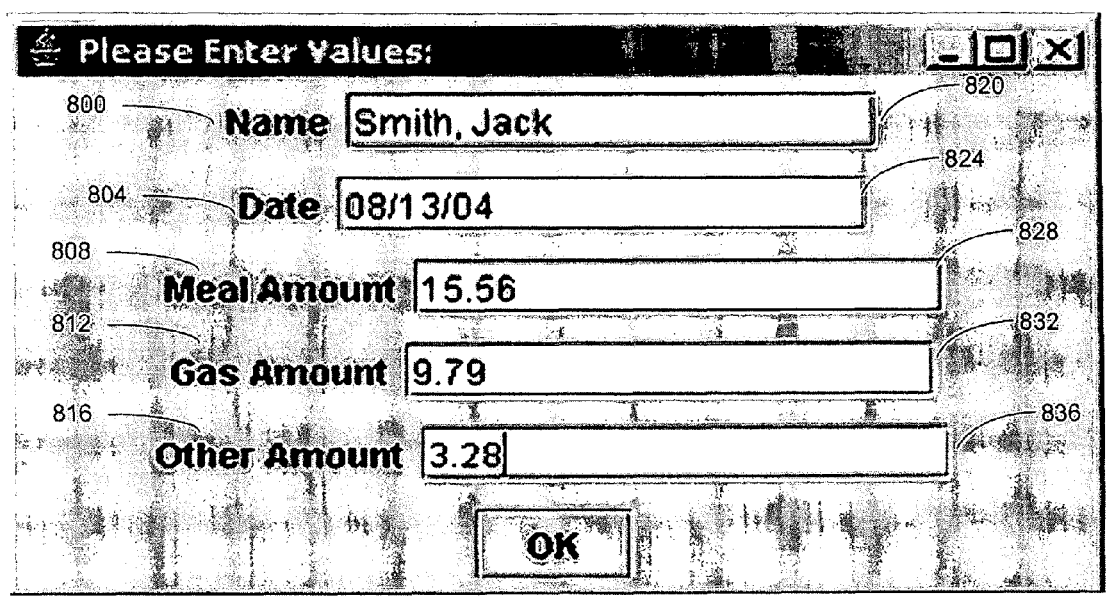
FIG. 11 illustrates the screen image of a dialog frame window created by executing a Dynamic Dialog Frame Program that is generated from using the extracted field names from the placeholders in an XML based template file as labels in the dialog frame window.

An example of a dialog window generated as a result of the calls to the getKeyValue module at block 708 and to the createPrompt module at block 712 is illustrated in FIG. 11 with the template file in XML format that is described below.

```
<?xml version = "1.0"?>
<?xml:stylesheet type = "text/xsl" href = "expense.xsl"?>
<!-- Expense Template    -->
<expense>
    <empName value="==var==Name==evar==" />
    <expDate value="==var==Date==evar==" />
    <item amount = "==var==Meal_Amount==evar==">
        <name>Meal</name>
        <description>
            Meal expense
        </description>
    </item>
    <item amount = "==var==Gas_Amount==evar==">
        <name>Gas</name>
        <description>
            Gasoline expense
        </description>
    </item>
    <item amount = "==var==Other_Amount==evar==">
        <name>Other Expense for ==var==Name==evar==</name>
        <description>
            Other expense
        </description>
    </item>
</expense>
```

In this file, the string values of the variable names are Name, Date, Meal_Amount, Gas_Amount, and Other_Amount. The corresponding placeholders are the strings of the format: ==var==variable name==evar, where variable name is one of these five string values. The getKeyValue module stores these five string values as key index values of the variable values hash array. It also stores them as elements of the variable key array. The createPrompt module displays the dialog window in FIG. 11. It creates the label Name from converting the string value of the first element of the variable key array, which is the string "Name", and displays this label at 800. It creates the label Date from converting the string value of the second element of the variable key array, which is the string "Date", and displays this label at 804. It creates the label Meal Amount from converting the string value of the third element of the variable key array, which is the string "Meal_Amount", and displays this label at 808. It creates the label Gas Amount from converting the string value of the fourth element of the variable key array, which is the string "Gas_Amount", and displays this label at 812. It creates the label Other Amount from the value of the five element of the variable key array, which is the string "Other_Amount", and displays this label at 816. After the user inputs the values for the five fields: "Smith, Jack" at 820, "08/13/04" at 824, "15.56" at 828, "9.79" at 832, and "3.28" at 836, respectively, the createPrompt module coverts the input values into a single string "Smith Jack;08/13/04;15.56;9.79;3.28" and stores it in the global variable varData. At block 716 and 714, the createFile module splits the string value of the variable varData and populates the variable values hash array with the following key-value pairs: "Name"—"Smith, Jack", "Date"—"Aug. 13, 2004", "Meal_Amount"—"15.56", "Gas_Amount"—"9.79", and "Other_Amount"—"3.28". At block 756 and 760, for a line of the template file that contains a placeholder, the createFile module creates a new line in the target file by extracting the field variable name from the placeholder and replacing the placeholder by the value corresponding the key index that has the string value of the field variable name. For example, from the line in the template file:

<empName value="=var=Name=evar="/> the following line is generated for the target file:

<empName value="Smith, Jack"/>

From block 744 to block 768 of FIG. 10, the program loop of the createFile module generates from the template file the complete target file with the following content:

```
<?xml version = "1.0"?>
<?xml:stylesheet type = "text/xsl" href = "expense.xsl"?>
<!-- Expense Template    -->
<expense>
    <empName value="Smith, Jack" />
    <expDate value="08/13/2004" />
    <item amount = "15.56">
        <name>Meal</name>
        <description>
           Meal expense
        </description>
    </item>
    <item amount = "9.79">
        <name>Gas</name>
        <description>
           Gasoline expense
        </description>
    </item>
    <item amount = "3.28">
        <name>Other Expense for Smith, Jack</name>
        <description>
           Other expense
        </description>
    </item>
</expense>
```

Figure 5C:
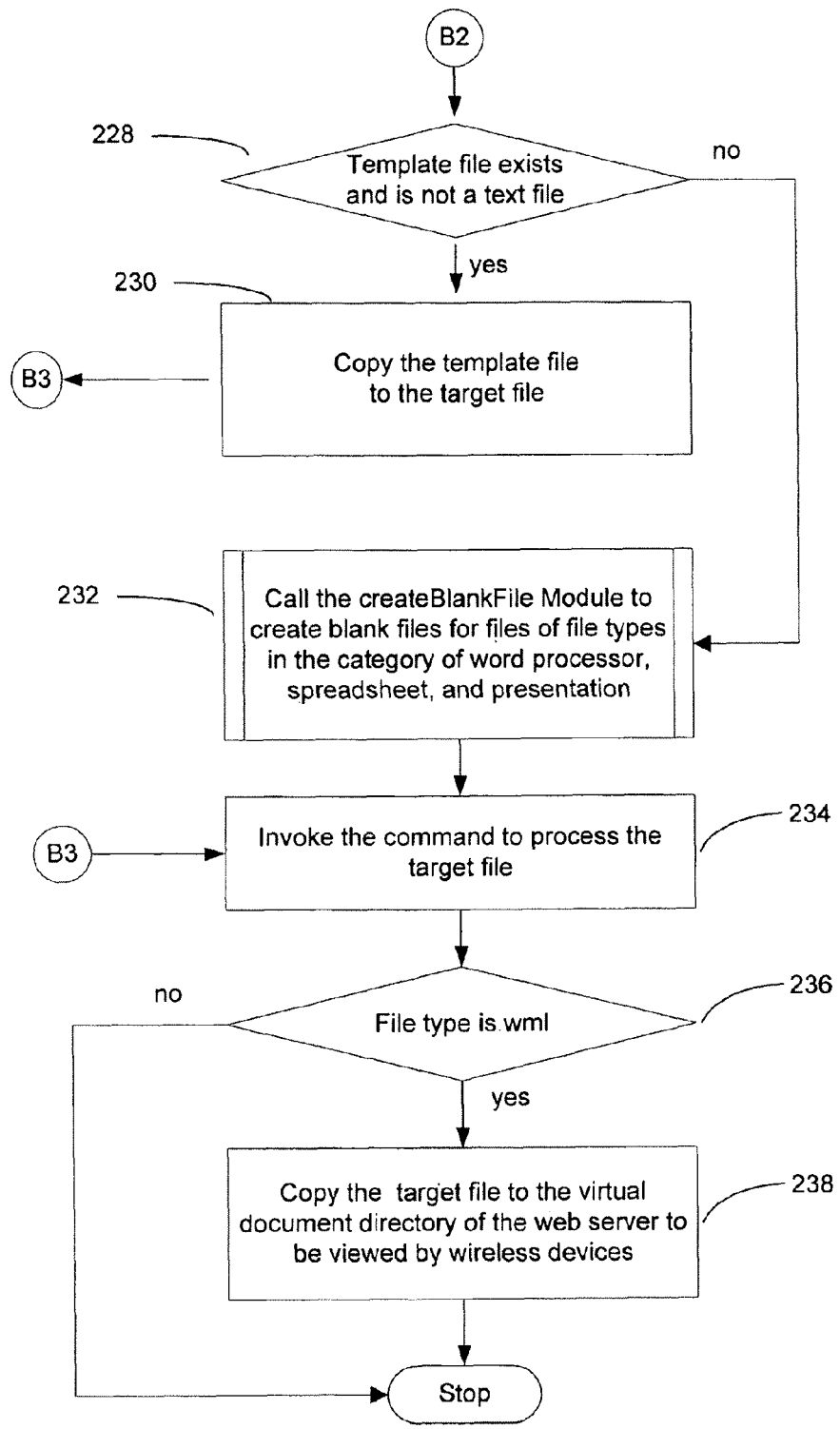
Figure 6A:
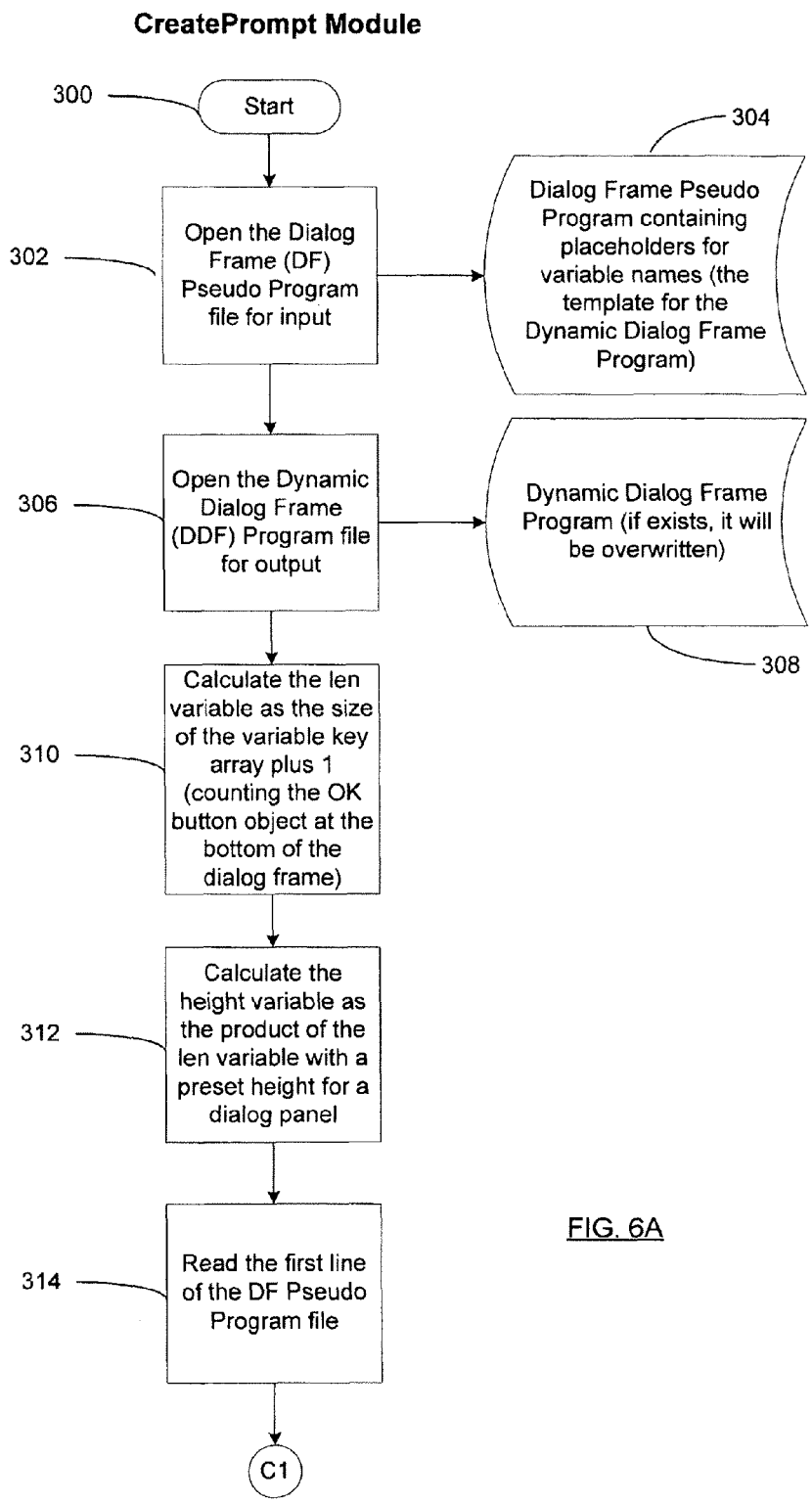
FIG. 6A-C is a flow chart that illustrates the steps of the createPrompt module. This module receives from the calling program or calling module prompting information that if will use to create a program that displays a dialog window to prompt for and to collect inputs from a user.
Figure 6B:
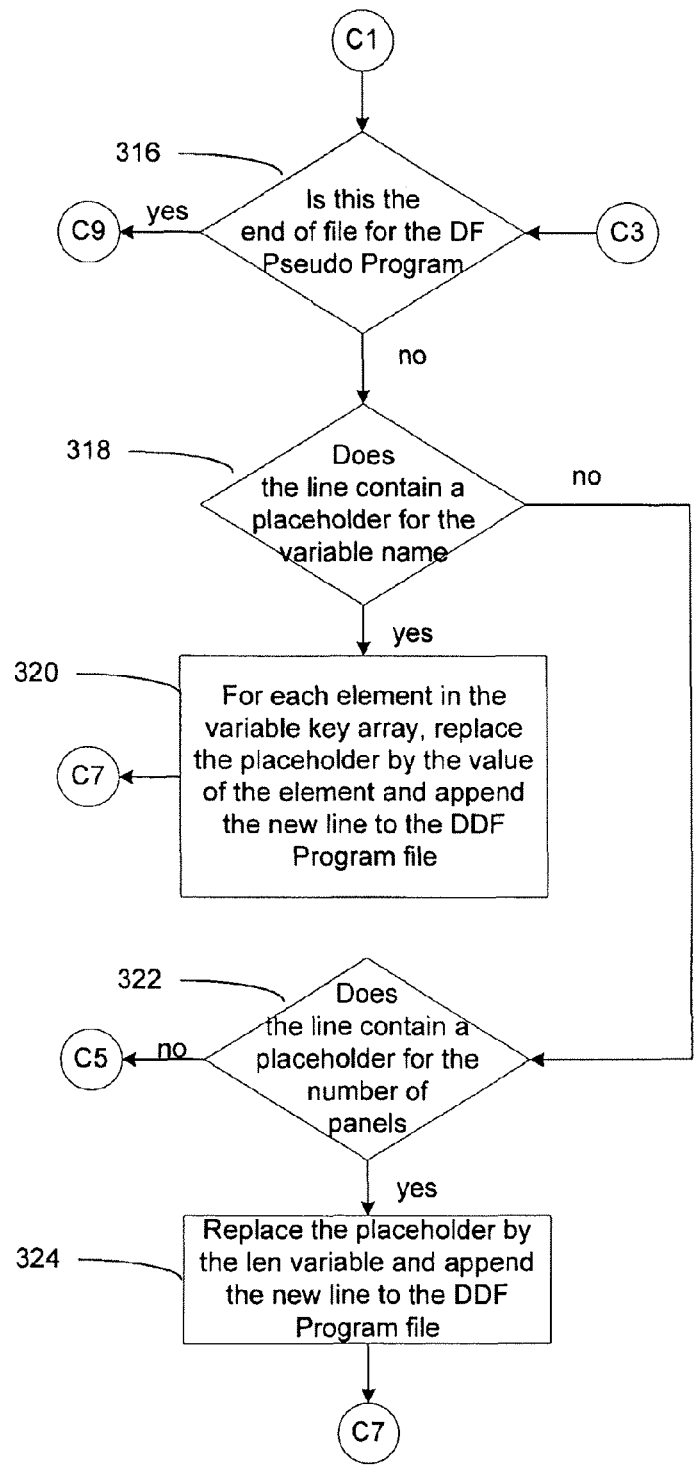
Figure 6C:
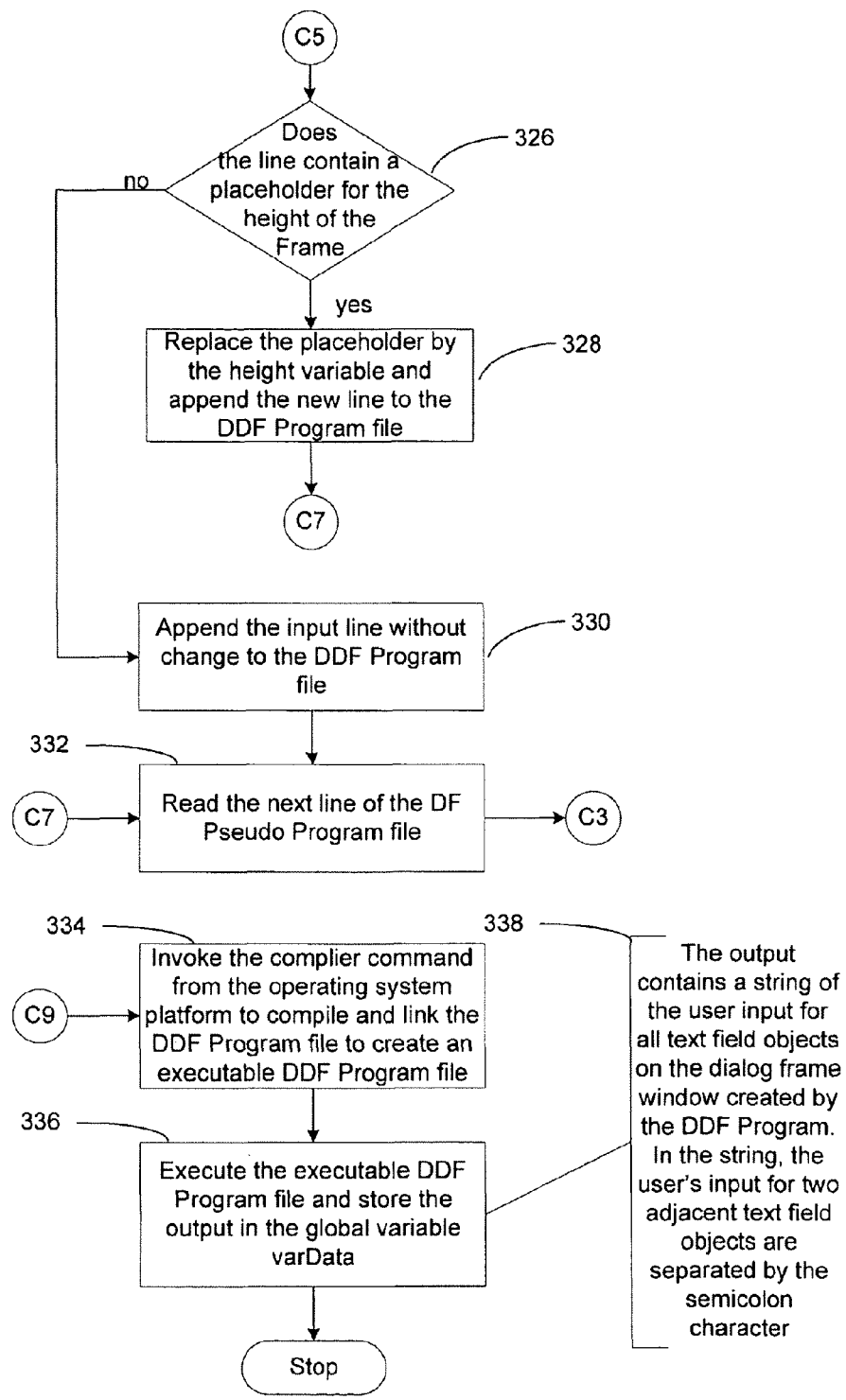
Figure 12:
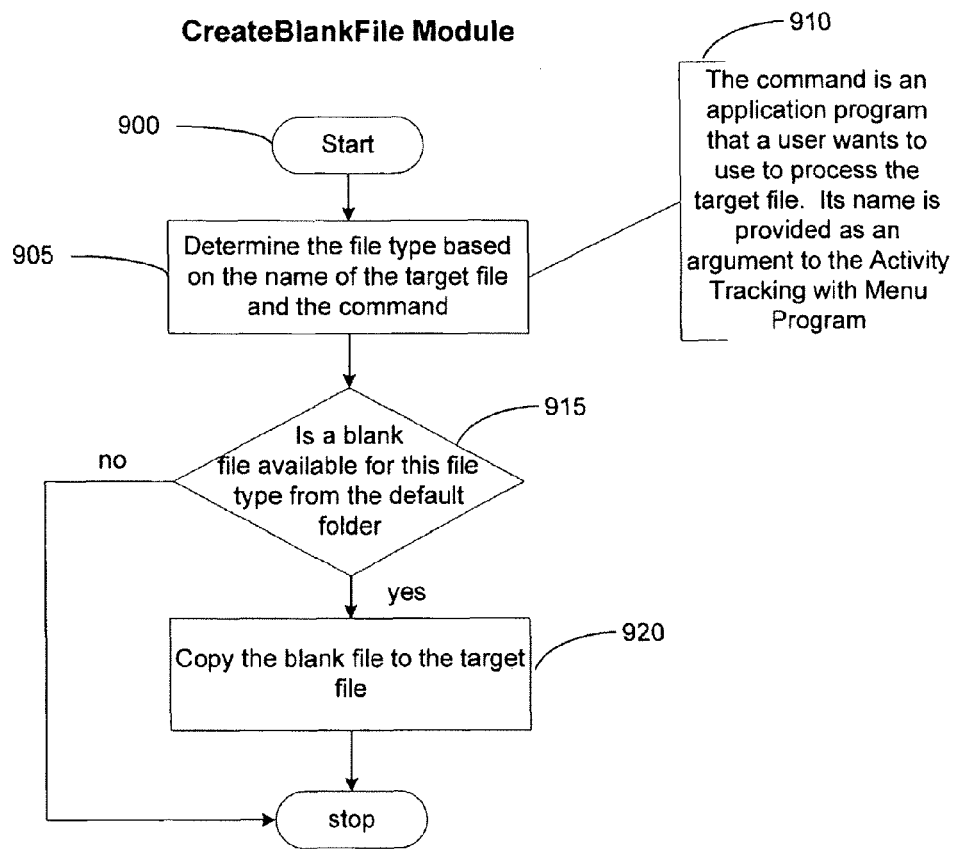
FIG. 12 is a flow chart that illustrates the steps of the createBlankFile module. The module creates an empty new target file, of which the file type is in the category of certain file types, to drop the warning messages for some application programs if the target files that they are to process do not exist.

As was illustrated at boxes 18 and 30 of FIG. 1 and at block 232 of FIG. 5C, the Check File Type Program (CFT Program) calls the createBlankFile module. As was discussed previously for Figure and the CFT Program, the createBlankFile module is called if the template file does not exist. FIG. 12 illustrates the createBlankFile module. The createBlankFile module creates an empty new target file, of which the file type is in the category of certain file types, to drop warning messages for some application programs if the target files that they are to process do not exist. At block 905, it determines the file type of the target file based on name of the target file and on the command, the application program that is to process the target file. At block 915, it checks whether a blank file is available for this file type in the default folder that contains blank files of various types; for example, word processing file, spreadsheet file, and presentation file and so on. If no, then it returns to the calling program, which is the CFT Program. If yes, then it copies the blank file to the target file and returns to the CFT Program.

Figure 13:
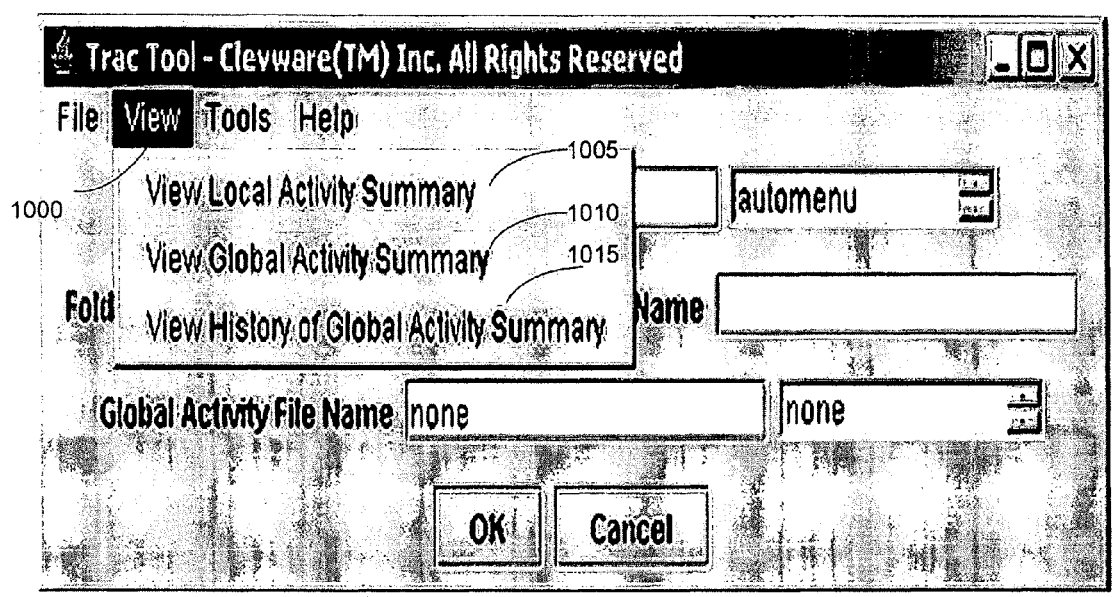
FIG. 13 illustrates the menu items if a user clicks on the View menu at box 51 of FIG. 2 or box 1000 of FIG. 13.

As is described in box 51 of FIG. 2, the Graphics User Interface Program (GUI Program) displays the View menu on the menu bar. FIG. 13 illustrates the menu items if a user clicks on the View menu at 1000. Three menu items are displayed: View Local Activity Summary at 1005, View Global Activity Summary at 1010, and View History of Global Activity Summary at 1015, respectively. If the user clicks the View Local Activity Summary menu item, the GUI Program displays in a new window the local activity summary file located in the folder where the last target file was processed. If the user clicks the View Global Activity Summary menu item, the GUI Program displays in a new window the Global Activity Summary file whose file name was selected by the user and is displayed at box 56 of FIG. 2. If the user clicks the View History of Global Activity Summary menu item, the GUI Program displays in a new window the names of the Global Activity Summary files that have been modified by the ATWM Program and the timestamps of the events of these modifications.

Figure 14:
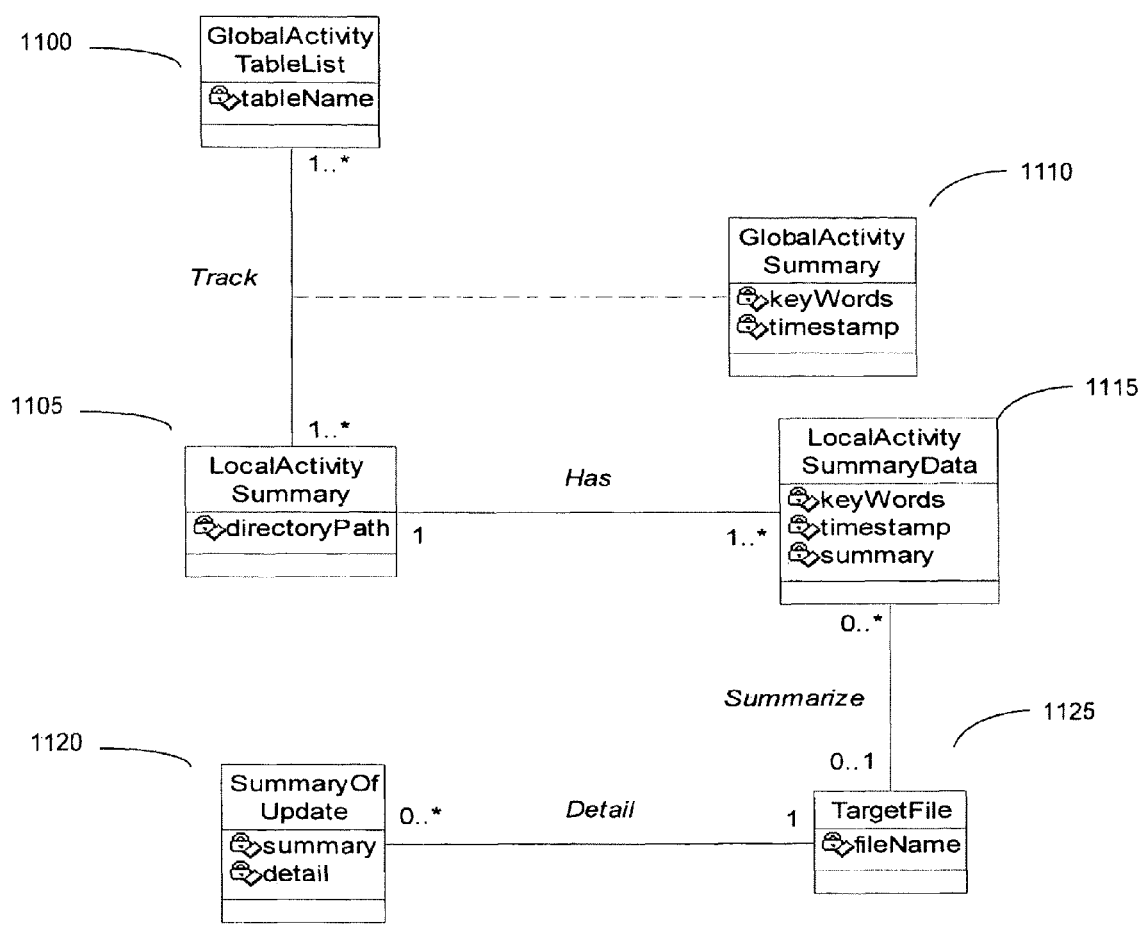
FIG. 14 illustrates a Database Object Modeling Diagram that guides a design and implementation of a database that contains local activity summary tables and global activity summary tables. This is the case that if a Relational Database is used instead of files to store data for local activity summary and for global activity summary.

As was discussed for the ATWM Program illustrated by FIG. 4, the local activity summary file and global activity summary file may be replaced by local activity summary table and global activity summary table, respectively, if Relational Database Management System (RDBMS) is used. FIG. 14 illustrates a Database Object Model Diagram that guides a design and implementation of a database that contains local activity summary tables and global activity summary tables. At box 1100, the object class GlobalActivityTableList represents the names of all global activity summary tables. At box 1105, the object class LocalActivitySummary represents the directory (folder) paths corresponding to local activity summary tables. In object-oriented modeling methodology, there is a many-to-many association between the two object classes: GlobalActivityTableList and LocalActivitySummary and thus the association becomes an association class named as GlobalActivitySummary, which, shown at box 1110, represents the logging of processing of target files globally. At box 1115, the object class LocalActivitySummaryData represents the logging of processing of target files locally. There is a one-to-many association between the two classes: LocalActivitySummary and LocalActivitySummaryData. At box 1125, the object class TargetFile represents the names of all target files that were processed before. There is a one-to-many association between the two classes: TargetFile and LocalActivitySummaryData. At box 1120, the object class SummaryOfUpdate represents the summaries and optional details of the processing of the target files. There is a one-to-many association between the two classes: TargetFile and SummaryOfUpdate. This object model illustrated in FIG.

14 specifies that in the implementation to RDBMS, all the six classes represented by boxes 1100 to 1125 should be implemented as database tables.

Figure 15:
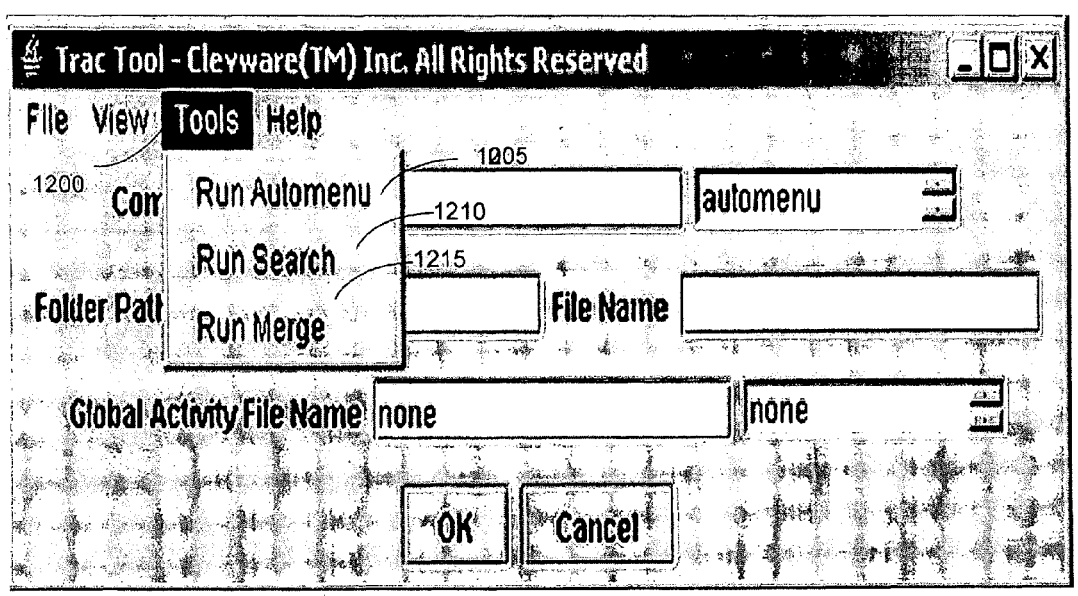
FIG. 15 describes the drop down menu when a user clicks on the Tools menu on the menu bar at 52 of FIG. 2 and at 1200 of FIG. 15.

FIG. 15 describes the drop down menu when a user clicks on the Tools menu on the menu bar at 52 of FIG. 2 and at 1200 of FIG. 15. The drop down menu contains three menu items: Run Automenu, Run Search, and Run Merge shown at 1205, 1210, and 1215, respectively. The menu item: Run Automenu starts the user driven menu program of the UDMGS system. A menu file such as but not limited to that shown at box 500 of FIG. 8 may be used as the menu configuration file for this user driven menu program. The menu item: Run Search starts the search program of the UDMGS system. The menu item: Run Merge starts the merge program of UDMGS system.

Hardware Platforms. It is assumed that those in the art should understand that the systems and methods of the present embodiment are, in the usual concept of software-based implementation, considered to be an application. In this view, the systems and methods of the present embodiment may be implemented as one or more applications on any suitable hardware platform(s) operated under the control of any suitable operating system(s).

Further Description Not Needed. The systems and methods of the example embodiments need not be further described here since those experienced in the art, based on the teachings of the embodiments discussed herein, will promptly understand how to implement the same. This is partly due to the widespread use of conventional operating systems and commands and command aliases therein to initiate the execution of various application programs to process files. The systems and methods of the example embodiments may be used on distributed computer systems, such as local area networks (LANs), wide area networks (WANs), wireless networks and Internet based networks. The common knowledge about and use of various commands and command aliases to invoke application programs to process files as just noted between computers on such networks makes it unnecessary to further describe the details of the protocols of these commands and command aliases. Furthermore, any suitable programming approach and any known communications and database protocols and software tools familiar to those writing software programs and related commands may be applied to implement the systems and methods of the example embodiments. These programming approaches include but not limited to using object-oriented programming components and relational databases. In addition, the systems and methods of the present example embodiments may be implemented as a collection of interrelated programs or modules/routines in any suitable programming language (or collection of languages) such as but not limited to object-oriented programming languages.

The example embodiments have been described in part by reference to block diagrams, flow chart diagrams and elements of systems and steps of methods. As is well known, suitable program instructions or coding provided in software are used to convert general purpose computers and/or processors into programmed computers and/or processors to form systems capable of implementing a specific application, such as the descriptions of the example embodiments.

Tangible Media as an Implementation. In addition, the software or other coding used to implement the example embodiments may be provided in any suitable form of computer program code embodied in tangible media, such as but not limited to removable storage media, including floppy diskettes and CD-ROMs, hard drives, tape drives, static or flash memory, or any other computer readable storage medium. When such computer program code or other code, containing the needed instructions, is loaded into and is ready for execution by suitable computers/processors, such programmed computers/processors become an apparatus for practicing the example embodiments. Therefore, it should be understood that another embodiment of the present invention is the computer program code needed for implementing the processes of the example embodiments when embodied in a tangible medium.

Additional example embodiments will now be described.

In modern computer operating systems, in addition to graphics user interfaces such as dialog frame windows, an input redirection facility is also commonly available to provide input to an application with data retrieved from an input data file. Such an input redirection enables a batch process in the sense that an application can run to its completion without users' interactions, even if this application requires input data. An example is that most commonly used programming languages nowadays, such as C/C++ programming language and Java programming language, allow the main function (or method or module) of the source programs to accept the name of an input data file as a command line argument of the application program that is compiled from the source programs. Most modern operating systems allow such an application program access the input data file internally from within the program and read from it without requiring the users to interactively enter the data values. Another example is that in the terminal window of a UNIX system, the standard input to an operating system command or to an application that normally requires input data from its interactions with users can be redirected to a data file by the '<' command operator such as UNIX_command_name<inpit_data_file_name or application_executable_file_name<input_data_file_name Each of the above two command lines may be embedded in a UNIX shell script and executed in a batch process; that is, the execution of the shell script can run to its completion without users' interactions. Similarly in the command prompt of a DOS terminal window of the Microsoft Windows operating system, the standard input to an operating system command or to an application that normally requires input data from its interactions with users can also be redirected to a data file by the '<' command operator such as DOS_command_name<data_file_name or application_executable_file_name<data_file_name Each of the above two command lines may be embedded in a Windows DOS batch file and executed in a batch process; that is, the execution of the batch file can run to its completion without users' interactions.

Figure 16:
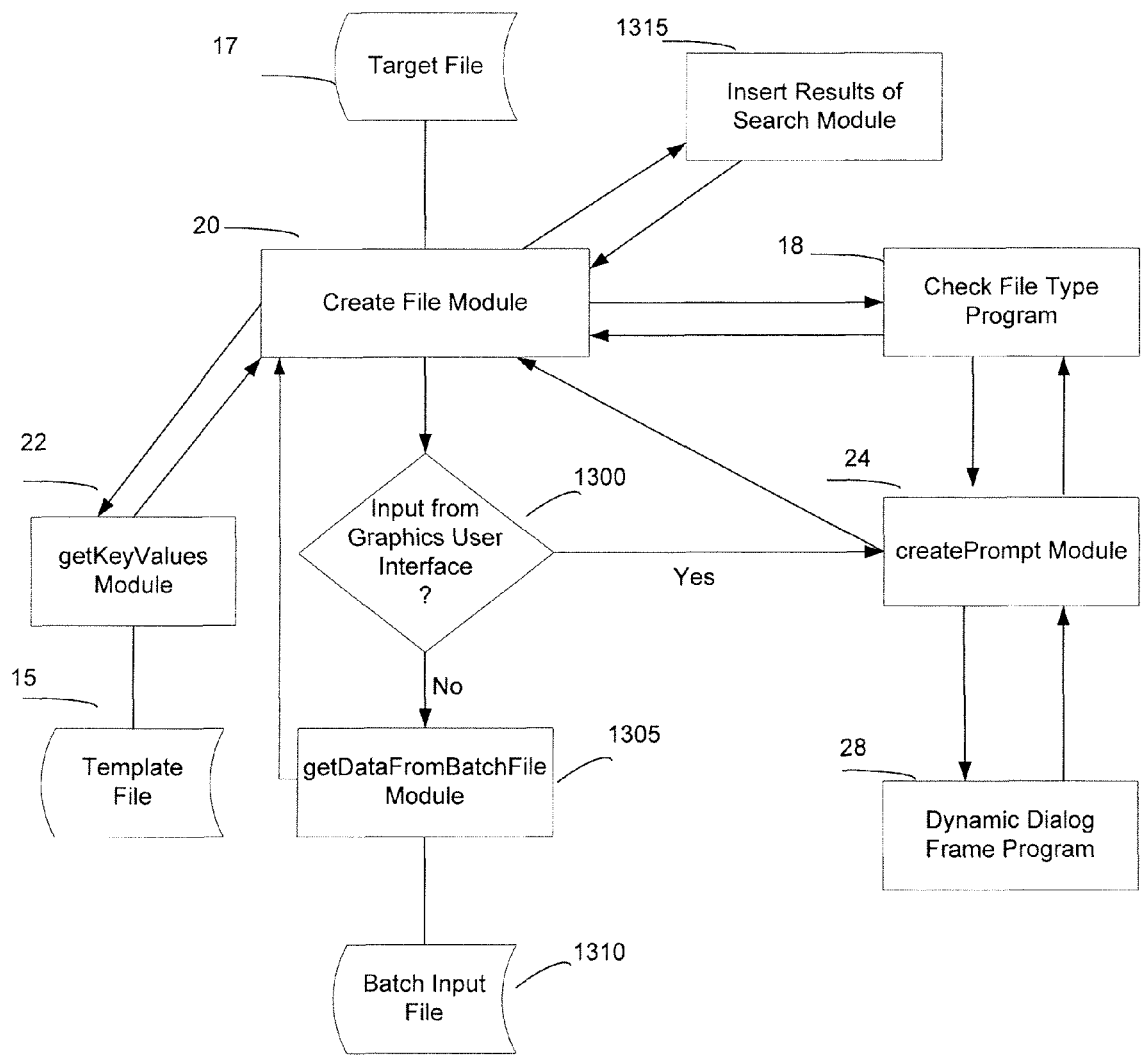
FIG. 16 illustrates further example system components and process flows.

In addition to using a dynamic frame window generated by the Dynamic Dialog Frame Program to collect input data from users to fill the changeable fields in a template file, a flag variable may be added in the Create File Module to indicate whether the input data are taken from a graphics user interface. If the value of the flag variable is yes, then the input are collected from a dynamic dialog window as specified before. If the value of the flag variable is no, then the input are collected in a batch process from one or more data files created previously by one or more users or one or more systems. FIG. 16 describes a part of the system surrounding the Create File Module (box 20) enhanced from FIG. 1. Four boxes 1300, 1305, 1310, and 1315 are added in FIG. 16. Box 1300 checks the value of the flag variable. If the value is "yes", then the execution goes to box 24, which is the createPrompt Module as discussed above. If the value is "no", then the execution goes to box 1305, which is the getDataFromBatchFile Module. The getDataFromBatchFile Module, described in detail elsewhere herein, gets the values for the changeable fields in the template file in the batch process from data files. Box 1310 represents the batch input data file. Box 1315 represents the Insert Results of Search Module, which will be described in detail in elsewhere herein.

Figure 17A:
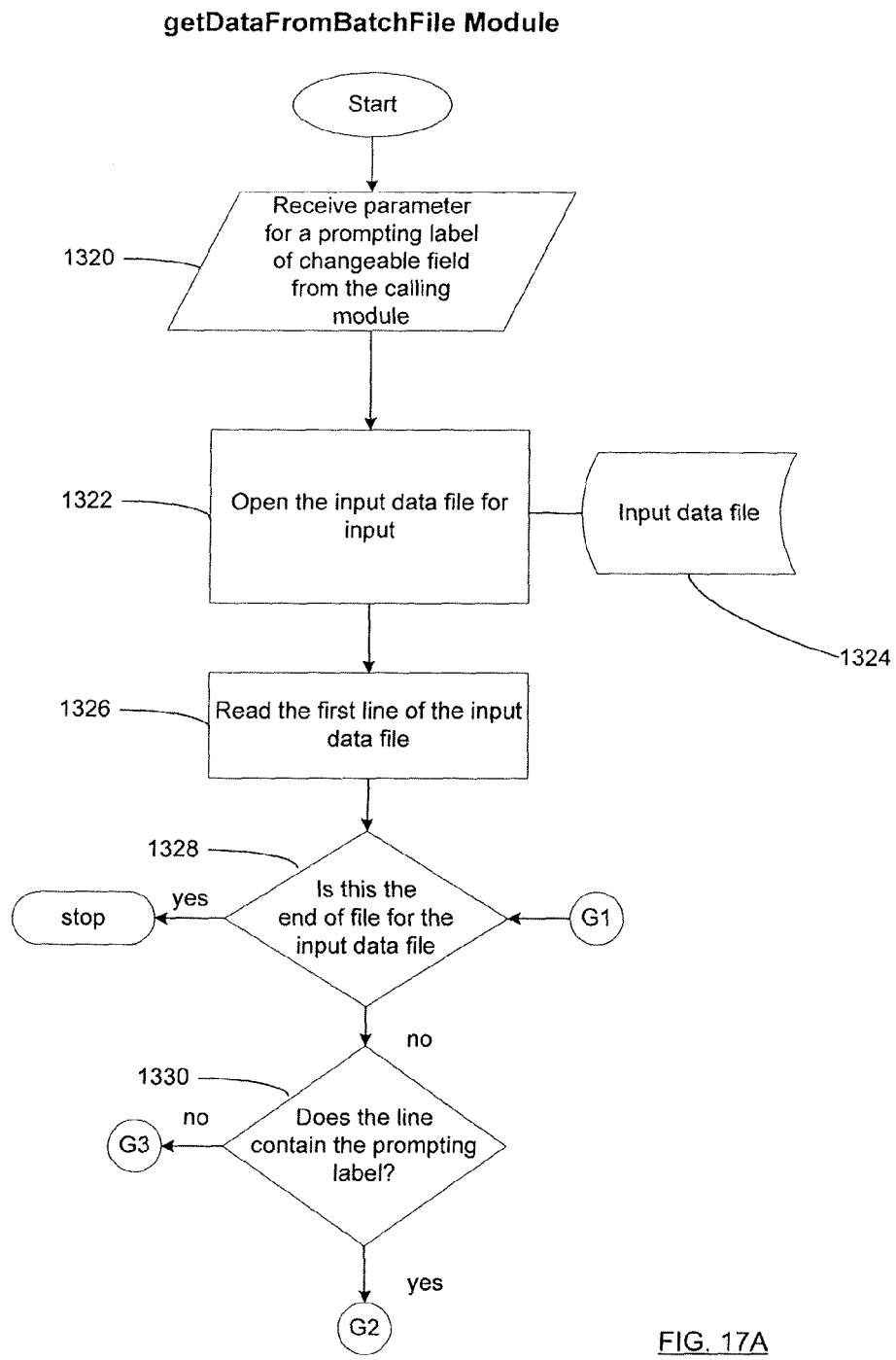
FIGS. 17A and 17B illustrate an example batch mode process.
Figure 17B:
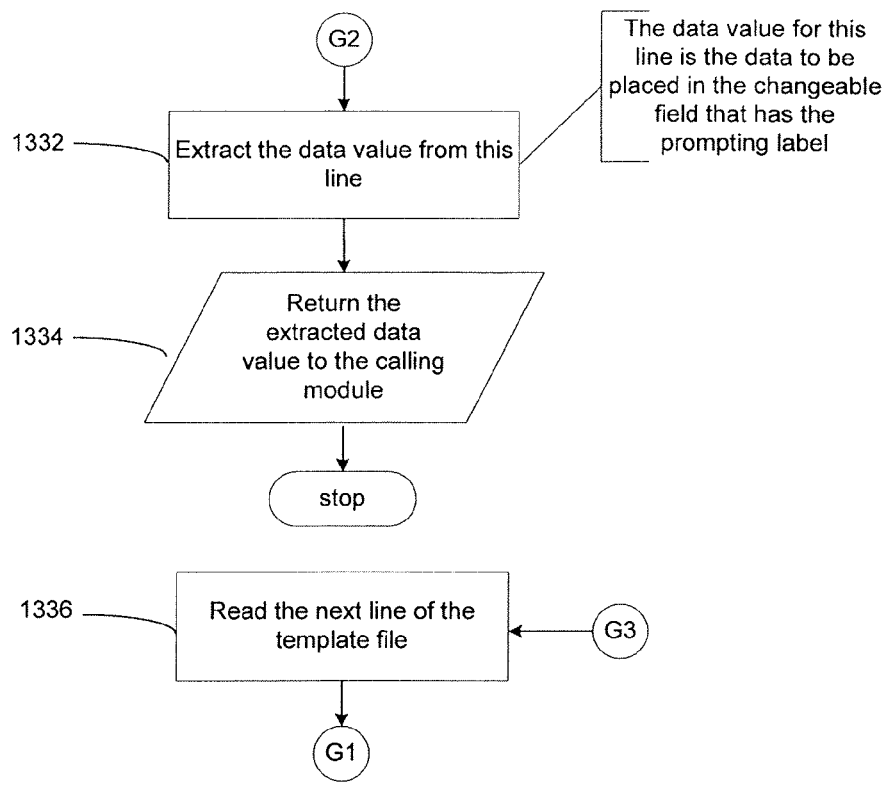

FIGS. 17A and 17B describe the flowchart for the getDataFromBatchFileModule. Box 1320 receives a parameter value for a prompting label, which is represented by a field variable name in the programming segments, of changeable field from a module that calls it. From FIG. 16 such a calling module is the Create File Module. The calling module expects that a filler data for the changeable field whose prompting label matches the parameter value to be returned. Box 1322 opens the input data file for input. Box 1324 represents such an input data file, which was created by a user or a system for the purpose of providing input data values for the changeable fields in the template file. Each line of the input data file is of the format:

Prompting label: data that fills the changeable field with the prompting label

In programming term, the prompting label in this format may be replaced by field variable name. Boxes 1326 to 1336 describe the steps of reading each line of the input file and finding the line that has the prompting label matching the parameter value. If such a line is found, then box 1332 extracts the data value and box 1334 returns the extracted value to the calling module.

Figure 18:
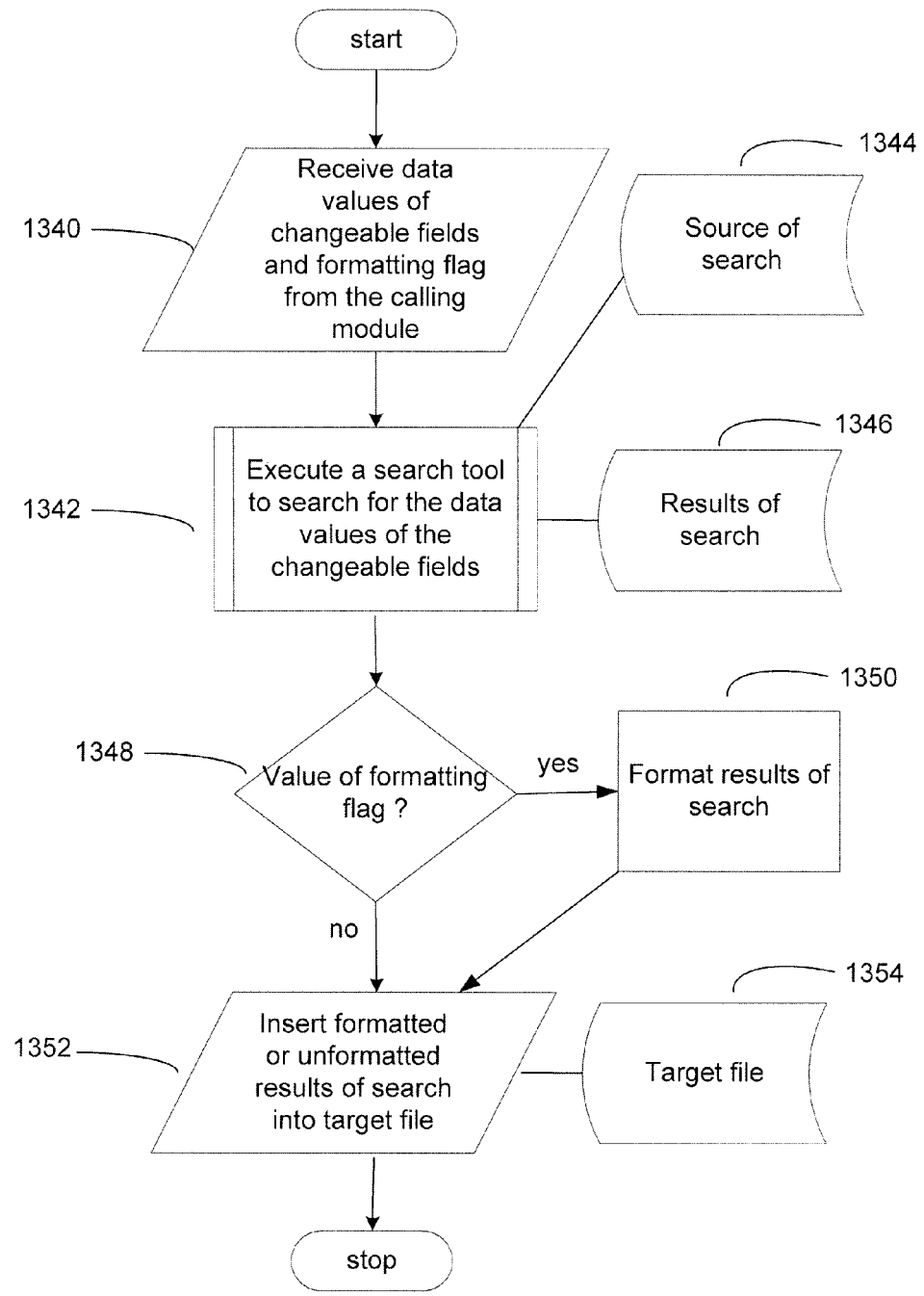
FIG. 18 illustrates an example process utilizing search results with respect to a target file.

FIG. 18 describes the flowchart of the insertResultsofSearch Module. Box 1340 receives data values of changeable fields from the calling module and a formatting flag with a value of "yes" or "no". From FIG. 16, such a calling module is the Create File Module. Box 1342 executes a search tool to search for these data values from a source repository, represented as box 1344. An example of the search tools is the search program of the UDMGS system, which is referenced as 1210 in FIG. 15. The search tool produces the results of the search, represented as box 1346. Box 1348 checks the formatting flag to see whether formatting is needed. If yes, then box 1350 formats the search results and goes to box 1352. If no, then box 1352 inserts the search results, unformatted or formatted, into the target file, represented as 1354. Examples of formatted results include but not limited to those in XHTML/HTML's unordered or ordered list format based on a certain ranking of the results of a search.

Figure 19:
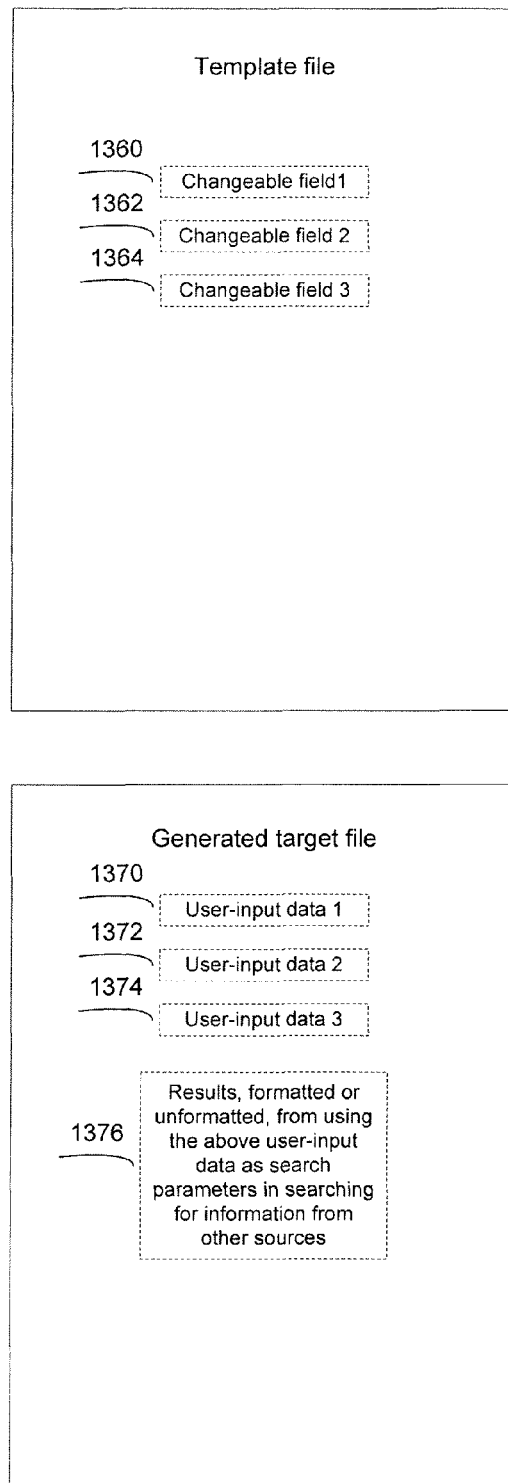
FIG. 19 illustrates an example template file and an example generated target file.

FIG. 19 shows an example of executing the insertResultsofSearch Module. Suppose a template file contains only three changeable fields and only the locations of these changeable fields are displayed; box 1360 represents the location of the changeable field 1, box 1362 represents the location of the changeable field 2, and box 1364 represents the location of the changeable field 3. FIG. 19 also shows an example of a target file generated from the template file. In this example, the three changeable fields in the template file are filled with three user- or system-provided input data values. Boxes 1370, 1372, and 1374 represent the result of the filling with three user-input data values for the boxes 1360, 1362, and 1364, respectively. In addition, box 1376 represents the effect of the insertion of results, formatted or unformatted, from using the three user-input data values in boxes 1370, 1372, and 1374 as search parameters in searching for information from other sources.

Figure 20:
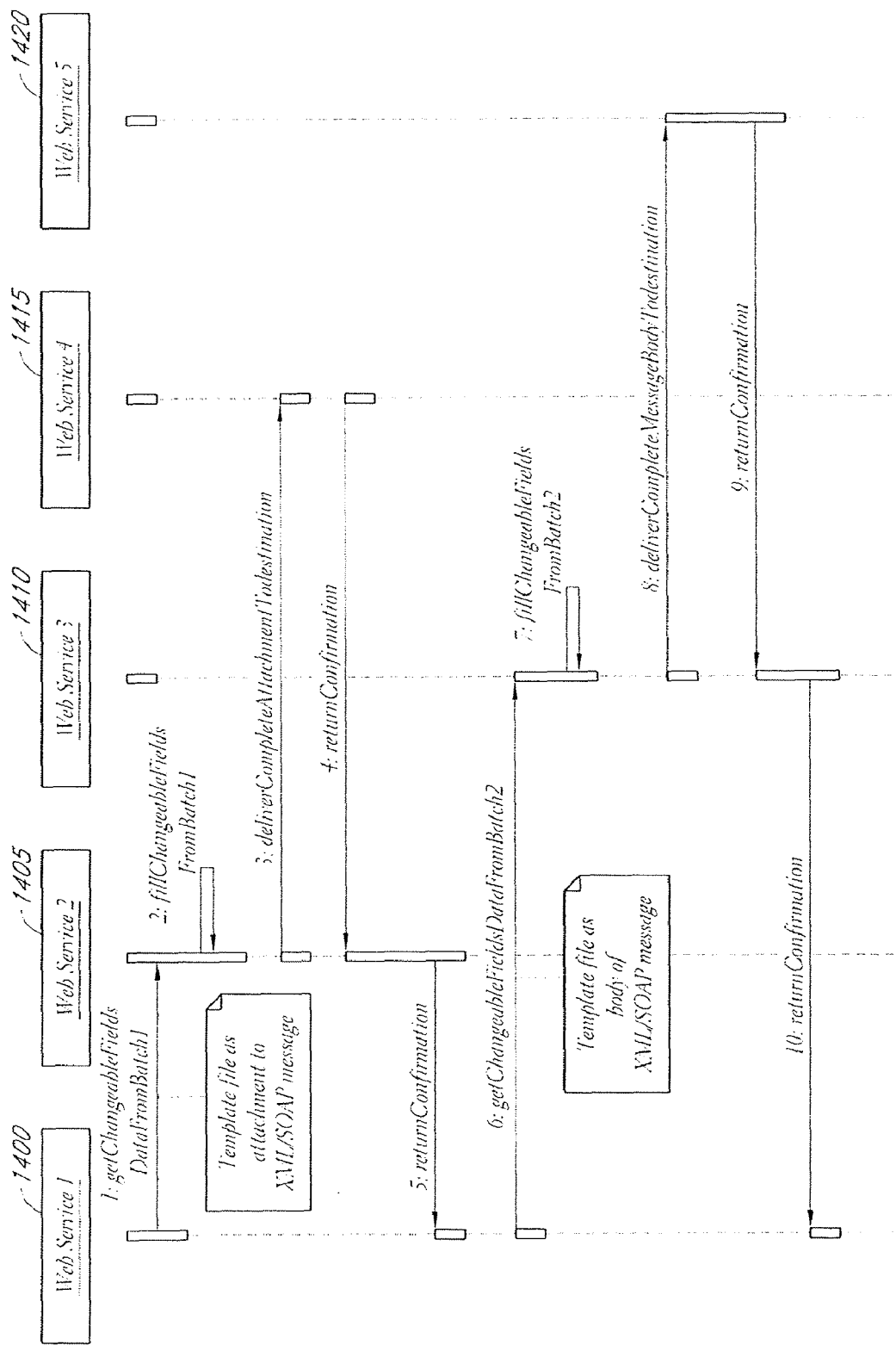
FIG. 20 illustrates an example sequence diagram.

The Unified Modeling Language (UML) standard specifies the sequence diagram as one of the tools that describes the interactions of object classes. FIG. 20 is a sequence diagram. Participants in the sequence diagram send messages to each other. FIG. 20 describes an example of the batch process of filling changeable fields in a template file, transmitted among Web services, with data values in a user- or system-provided data file at one of the transmission locations. In Service-Oriented Architecture (SOA), messages are transmitted between Web services through Simple Object Access Protocol (SOAP) format, which is based on the XML standard. The container of a SOAP message is called a SOAP envelop. A SOAP envelop has header and body. It may carry a file as its attachment, which may contain text data. The body of a SOAP envelop consists of text data. Five Web services are represented as 1400, 1405, 1410, 1415, and 1420 in FIG. 20 respectively.

In FIG. 20, Web service 1400 intends to send a file to Web service 1415. The scenario is that the file in question is incomplete and it needs to be filled with some data that can only be provided by Web service 1405. So it sends a template file with changeable fields for those data as an attachment to a SOAP message. In FIG. 20, the name of the message is getChangeableFieldsDataFromBatch1. After receiving the message, Web service 1405 calls a module named fillChangeableFieldsFromBatch1, which will be described in detail elsewhere herein, to fill the changeable fields in the attached template file with values from a data file that it has, which can be created by either a user or a system, through a batch process. Web service 1405 then proceeds to send the completed attachment to the Web service 1415, which is the destination. After receiving the completed attachment, Web service 1415 sends a confirmation message to Web service 1405, which in turn sends a confirmation message to Web service 1400.

In FIG. 20, Web service 1400 intends to send another file to another Web service 1420. The scenario is that the file in question is also incomplete and it needs to be filled with some data that can only be provided by Web service 1410. So it sends a template file with changeable fields for those data in the body the SOAP message. In FIG. 20, the name of the message is getChangeableFieldsDataFromBatch2. After receiving the message, Web service 1410 calls a module named fillChangeableFieldsFromBatch2, which will be described in detail elsewhere herein, to fill the changeable fields in the body of the SOAP message with values from a data file that it has, which can be created by either a user or a system, through a batch process. Web service 1410 then proceeds to send the completed SOAP body to the Web service 1420, which is the destination. After receiving the completed SOAP body, Web service 1420 sends a confirmation message to Web service 1410, which in turn sends a confirmation message to Web service 1400.

Figure 21A:
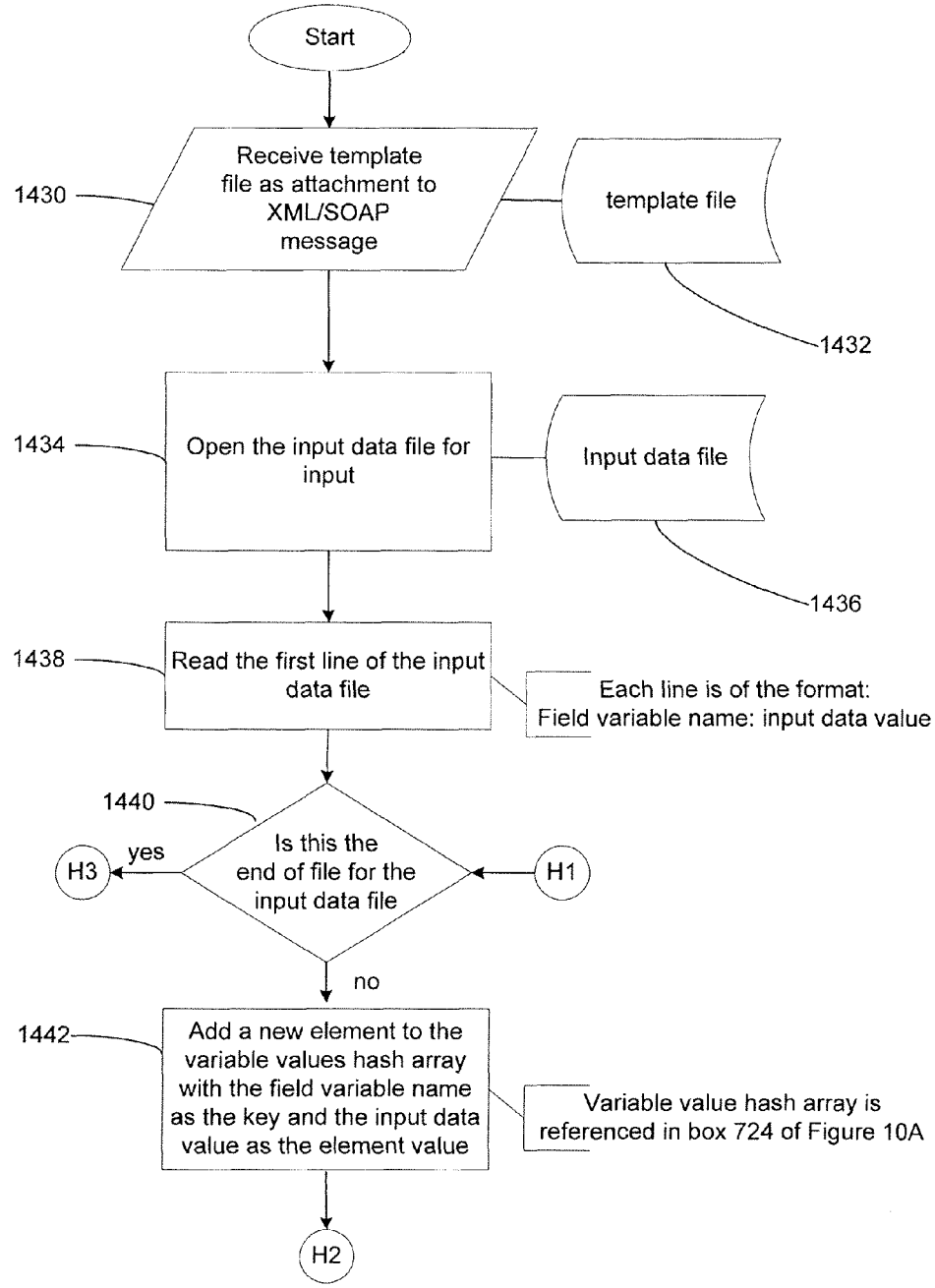
FIGS. 21A, 21B, 22 illustrate example processes related to replacing changeable fields with corresponding field variable names.
Figure 21B:
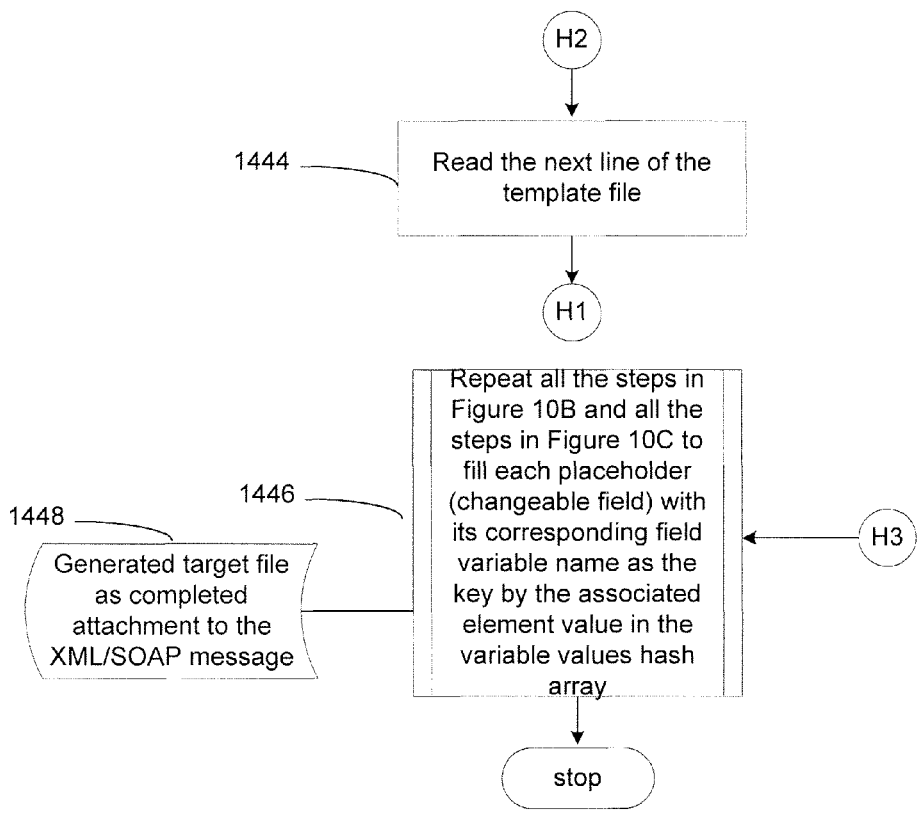

FIGS. 21A and 21B describe the flowchart of the fillChangeableFieldsFromBatch1 module. Box 1430 receives a template file as an attachment to the XML/SOAP message. Box 1432 represents the template file. Box 1434 opens the input data file, represented as box 1436. Boxes 1438 to 1444 read or process each line of the input data file. As noted above, each line of the input data file is of the format:

Prompting label: data that fills the changeable field with the prompting label

In programming term, the prompting label in this format may be replaced by field variable name. So the line can be considered to be in an equivalent format, which has two fields separated by the ";" character:

Field variable name: data that fills the changeable field with the field variable name For each line of the input data file, box 1442 adds a new element to the variable values hash array, which is referenced above and in box 724 of FIG. 10A, with the field variable name as the key and the data in the second field on the line as the element value. Box 1446 represents the process of repeating all the steps in FIGS. 10B and 10C to fill each placeholder (changeable field) with its corresponding field variable name as the key by the associated element value in the variable values hash array. Box 1448 represents the generated target file as the completed attachment to the XML/SOAP message, which is then sent by the Web service 2, represented as 1405 in FIG. 20, to the Web service 4, represented as 1415 in FIG. 20.

Figure 22:
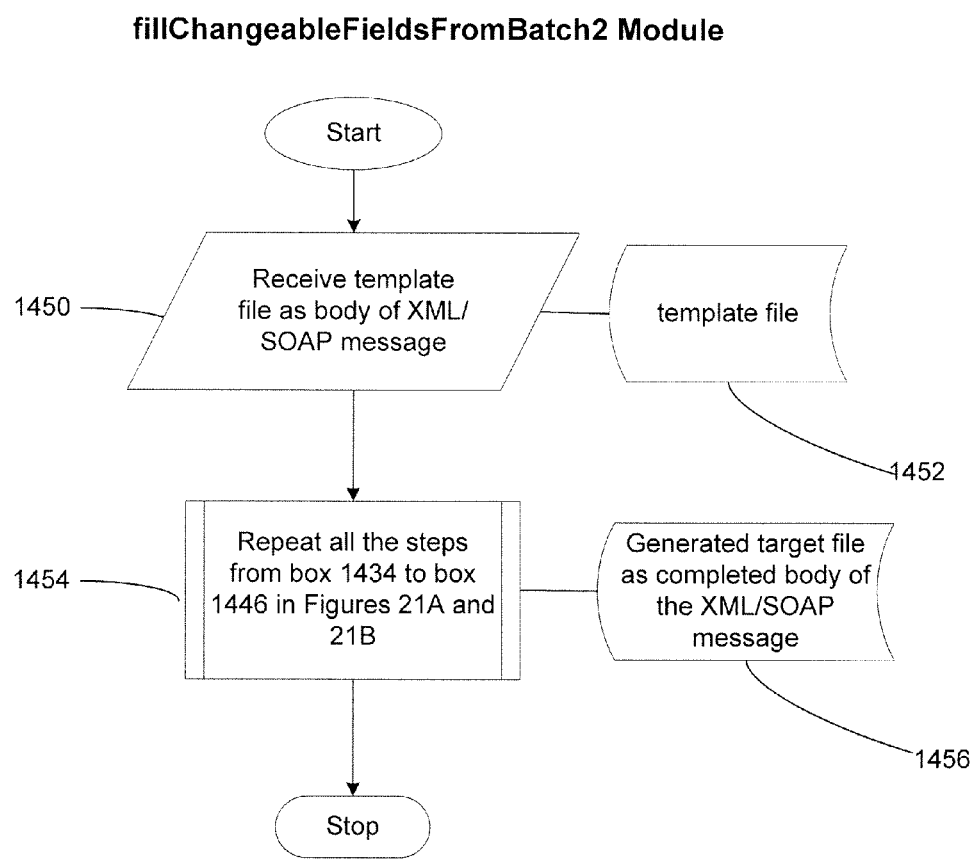

FIG. 22 describes the flowchart of the fillChangeableFieldsFromBatch2 module. Box 1450 receives a template file as the body of the XML/SOAP message. Box 1452 represents the template file. Box 1454 represents the process of repeating all the steps from boxes 1434 to 1446 in FIGS. 21A and 21B. Box 1456 represents the generated target file as the completed body of the XML/SOAP message, which is then sent by the Web service 3, represented as 1410 in FIG. 20, to the Web service 5, represented as 1420 in FIG. 20.

Figure 23:
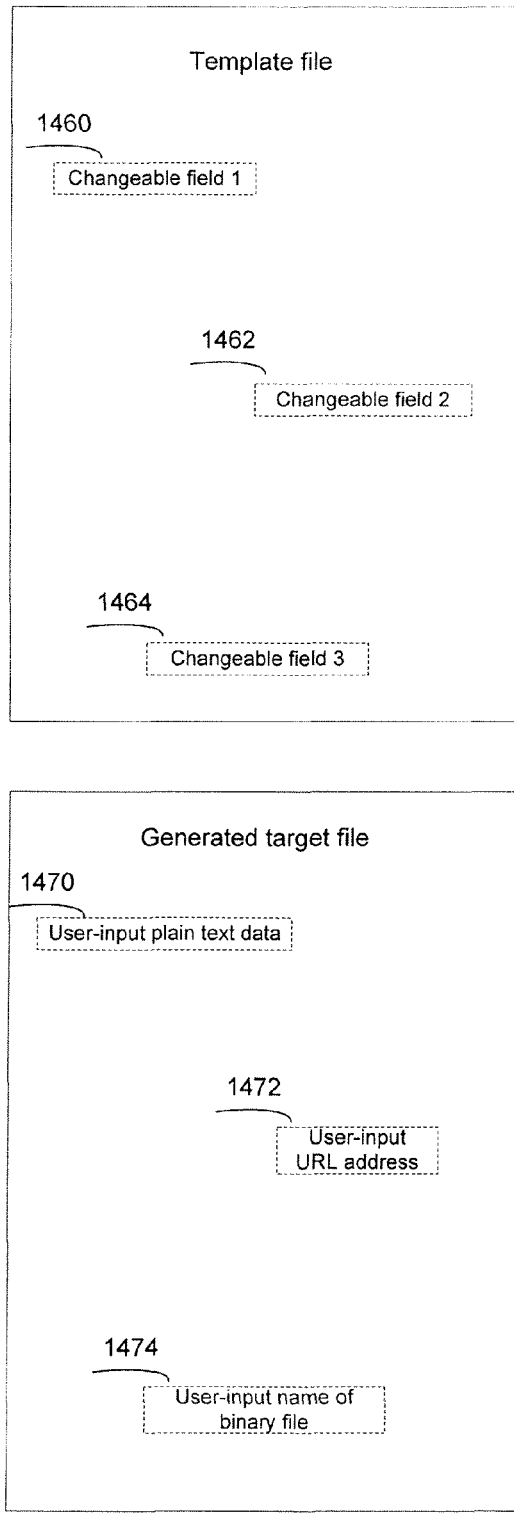
FIG. 23 illustrates another example template file and another example generated target file.

User- or system-provided input data values for changeable fields in a template file include but not limited to text data or reference names, such as hyperlinks, to external sources; the external sources can be text files, HTTP/Uniform Resource Locators (URL's) as hyperlinks, or non-text files such as binary files or graphics image files. FIG. 23 shows a template file in which only the locations of changeable fields are displayed; box 1460 represents the location of the changeable field 1, box 1462 represents the location of the changeable field 2, and box 1464 represents the location of the changeable field 3. FIG. 23 also shows an example of a target file generated from the template file. In this example, the three changeable fields in the template file are filled with three user- or system-provided input data values; box 1470 represents the result of the filling through which the changeable field in box 1460 is filled with a user-input plain text data; box 1472 represents the result of the filling through which the changeable field in box 1462 is filled with a user-input URL address as a hyperlink; box 1474 represents the result of the filling thorough which the changeable field in box 1464 is filled with a user-input name of a binary file.

Figure 24:
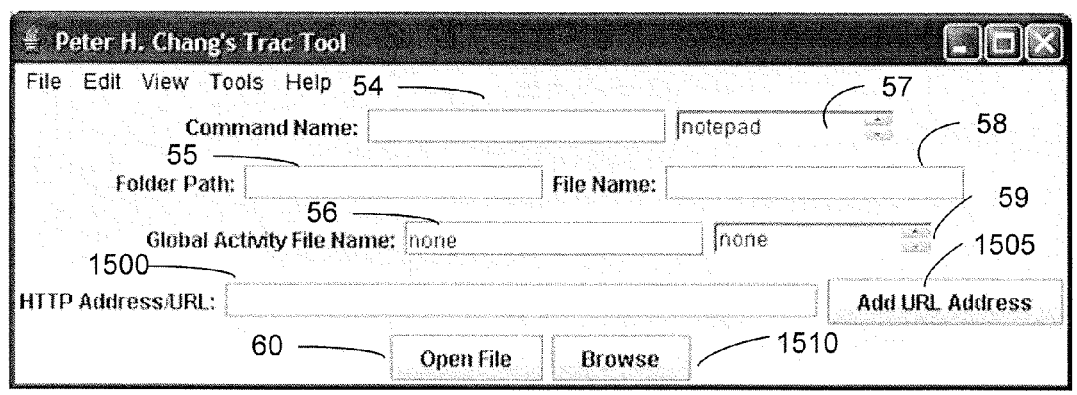
FIGS. 24, 25, 26A, 26B, 27, 28, 29, 30A, 30B, 31A, 31B, 32A, 32B, and 33, illustrate a variety of user interfaces, including those used to receive data and specifications from a user, and output user interface.

FIG. 2 illustrates the main screen displayed by the Graphics Users Interface Program (GUI Program). FIG. 24 enhances FIG. 2 with the addition a textbox (box 1500) containing a (HTTP) Web address in the Uniform Resource Locator (URL) format. It also adds a command button (box 1505) that, if clicked, displays a dialog frame window that lists the Web addresses of all Web pages that are being displayed by the Web browser program. If a user clicks to select one list item on this list, then the Web address on this item is copied to the text box (box 1500). In addition, it adds a command button (box 1510) that, if clicked, the Web browser downloads and displays the Web page whose address is displayed in box 1500.

Figure 25:
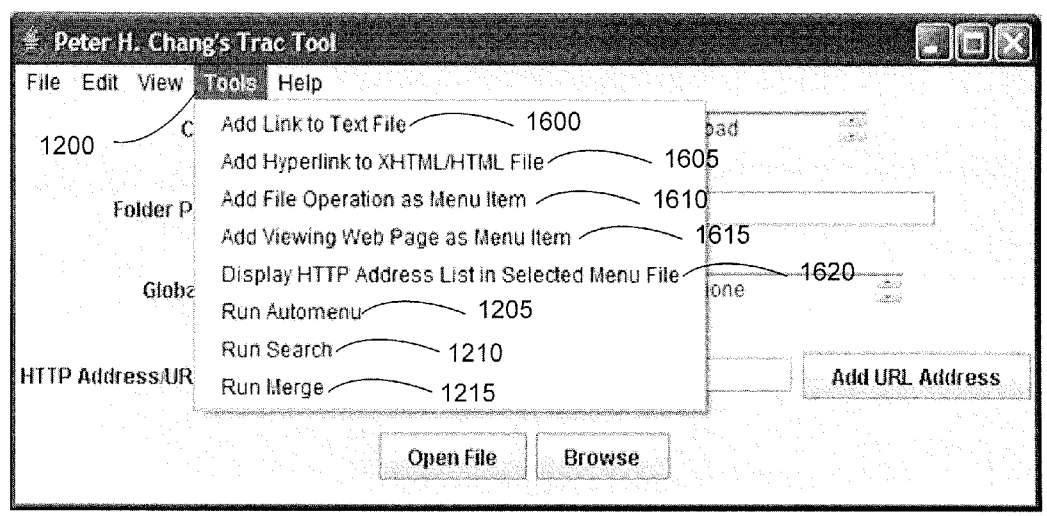

FIG. 25 describes the drop down menu when a user clicks on the Tools menu on the menu bar at 52 of FIG. 2 and at 1200 of FIG. 15. FIG. 25 enhances FIG. 15 with the additions of five more menu items represented by boxes 1600, 1605, 1610, 1615, and 1620, respectively.

In FIG. 25, if box 1600 is clicked, the system appends the Web address in box 1500 of FIG. 24 to a text file with its folder path and file name selected in boxes 55 and 58, respectively, of FIG. 24.

In FIG. 25, if box 1605 is clicked, the system appends the Web address in box 1500 of FIG. 24 as a hyperlink to an XHTML/HTML file with its folder path and file name selected in boxes 55 and 58, respectively, of FIG. 24.

In FIG. 25, if box 1610 is clicked, the system adds the file operation as a menu item to a menu whose configuration file resides in the selected folder; the folder path for the selected folder and file name of this file are in boxes 55 and 58, respectively, of FIG. 24; the command for the operation is in box 54 of FIG. 24.

In addition to downloading an XHTML/HTML file as a Web page from a remote Web server and display it, a Web browser can also display an XMTML/HTML file in a local folder as a Web page. In FIG. 25, if box 1615 is clicked, assuming that the selected file in box 58 of FIG. 24 is an XHTML/HTML file, the system adds the Web browser operation as a menu item to a menu whose configuration file resides in the selected folder; the folder path for the selected folder and file name of this file are in boxes 55 and 58, respectively, of FIG. 24.

In FIG. 25, if box 1620 is clicked, the system searches for all the (HTTP) Web addresses in a menu configuration file, which resides in the folder whose path is selected in box 55 of FIG. 24, and displays them in a list in a pop up window. If a user clicks to select one of the items in the list, then the Web address associated with this item is copied to box 1500 of FIG. 24. A user can then use this Web address information to do other tasks that were discussed earlier such as invoking the Web browser to download and display the Web page with this address by clicking on the command button in box 1510 of FIG. 24.

The foregoing processes described above can be applied to the following illustrated example on receiving input data of strings to be searched from a source repository and displaying search results. Suppose a furniture company has a Web site that provides order fulfillment service. Part of the Web site has a products section under which there are three sections that list the products in chair, desk, and table, respectively. The source repository for the search is this products section. A template of a Web page for search can be created in the following XHTML/HTML language format in a file named mysearch.html:

```
<html>
    <head>
        <title>Search Product Information</title>
    </head>
    <body>
        <h1 style="color:blue">Product Information</h1>
        <hr noshade>
        <table>
            <tr><th>Searched Strings</th></tr>
            <tr><td>
                %var%Searched_String_1%evar%
            </td></tr>
            <tr><td>
                %var%Searched_String_2%evar%
            </td></tr>
            <tr><td>
                %var%Searched_String_3%evar%
            </td></tr>
        </table>
```

Figure 26A:
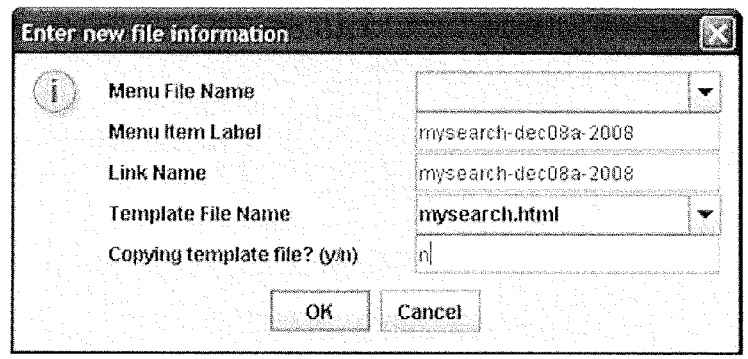
Figure 26B:
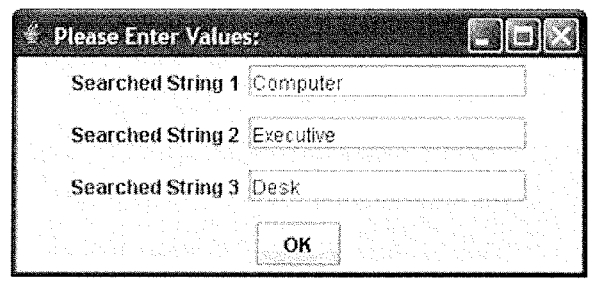

FIG. 26A shows that the selection of this template to generate a new target file as the source file of the search Web page. Suppose the name of the target file is mysearch-dec08a-2008.html. As was discussed before either a generated graphics user interface or a batch process can be used to collect user inputs. Suppose the graphics user interface approach is utilized. FIG. 26B displays the generated graphics user interface in which three strings to be searched are entered as: Computer, Executive, and Desk respectively.

The generated target file mysearch-dec08a-2008.html has the following content.

```
<html>
  <head>
    <title>Search Product Information</title>
  </head>
  <body>
    <h1 style="color:blue">Product Information</h1>
    <hr noshade>
    <table>
      <tr><th>Searched Strings</th></tr>
      <tr><td>
        Computer
      </td></tr>
      <tr><td>
        Executive
      </td></tr>
      <tr><td>
        Desk
      </td></tr>
    </table>
```

The example illustrated so far partly describes FIG. 19 in that three changeable fields are filled with three input data values provided by a user as strings to be searched. Next, a search program to search for these three strings in the XHTML/HTML source files of all the Web pages on the products section of the Web site. The results of the search are appended to the source file of the Web page: mysearch-dec08a-2008.html. Its content is now:

```
<html>
  <head>
    <title>Search Product Information</title>
  </head>
  <body>
    <h1 style="color:blue">Product Information</h1>
    <hr noshade>
    <table>
      <tr><th>Searched Strings</th></tr>
      <tr><td>
        Computer
      </td></tr>
      <tr><td>
        Executive
      </td></tr>
      <tr><td>
        Desk
      </td></tr>
    </table>
    <hr noshade>
    <h1>The following pages may contain the string Computer
    </h1>
    <p>
    <br>
    <ul>
      <li><a
href="http://localhost/products/desk/index.html">products/desk/index.html
</a></li>
    </ul>
    <h1>The following pages may contain the string Executive
    </h1>
    <p>
    <br>
    <ul>
      <li><a
href="http://localhost/products/chair/index.html">products/chair/
index.html</a></li>
      <li><a
href="http://localhost/products/desk/index.html">products/desk/index.html
</a></li>
    </ul>
    <h1>The following pages may contain the string Desk</h1>
    <p>
    <br>
    <ul>
      <li><a
href="http://localhost/products/desk/index.html">products/desk/index.html
</a></li>
    </ul>
  </body>
</html>
```

Figure 27:
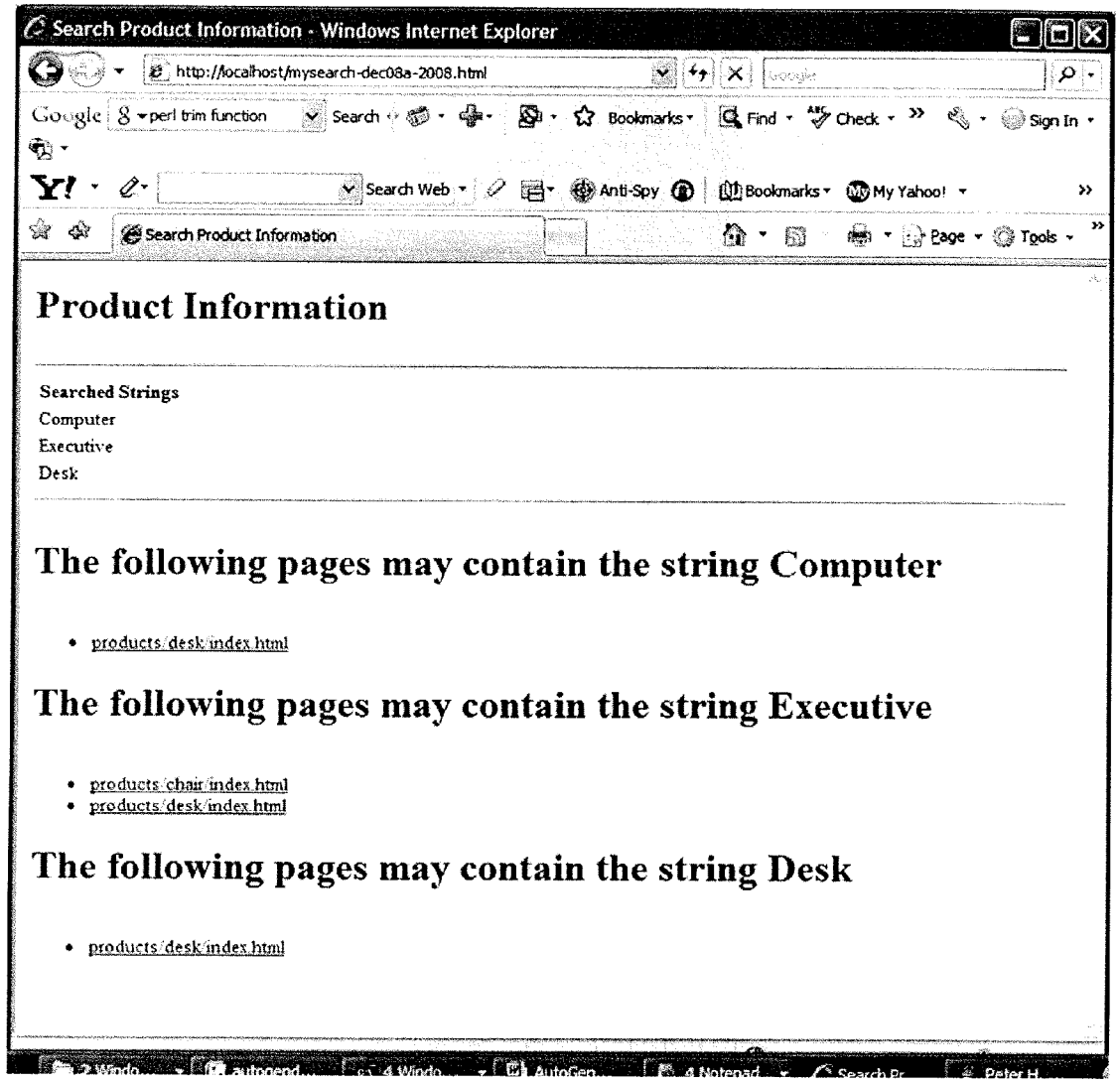
Figure 28:
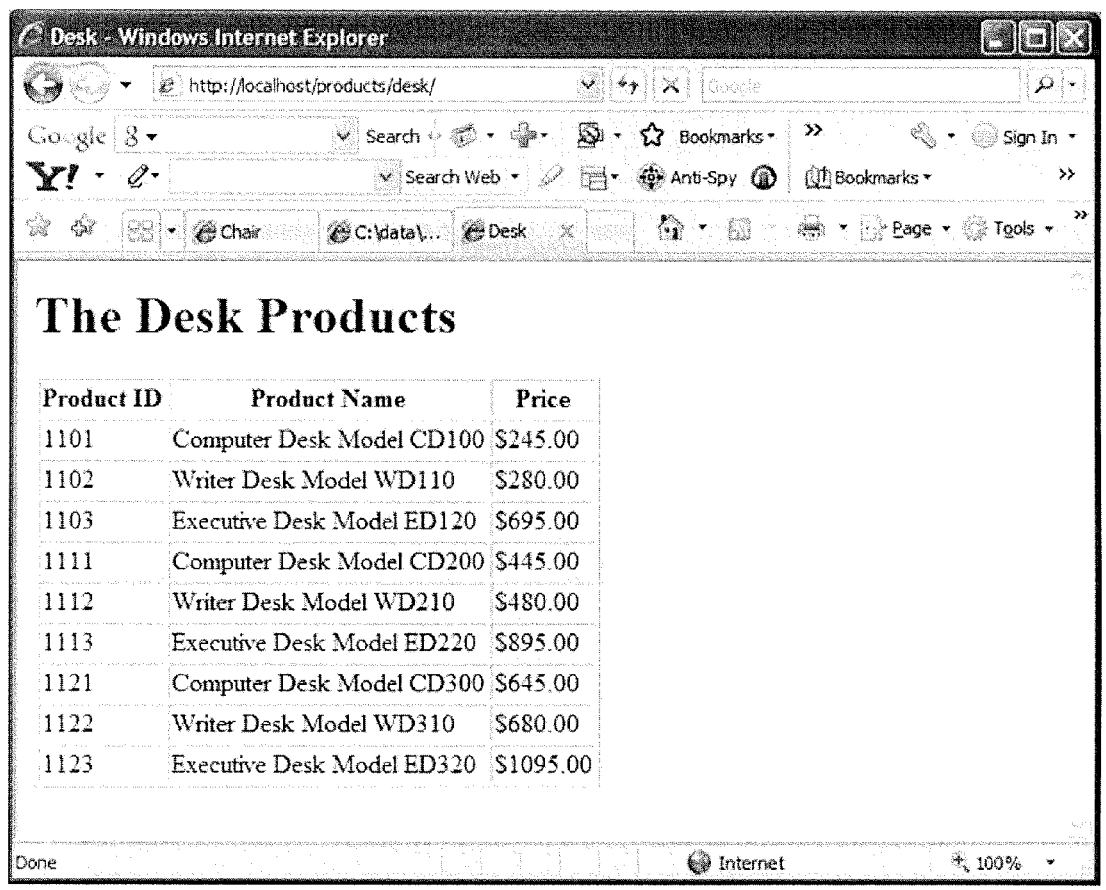
Figure 29:
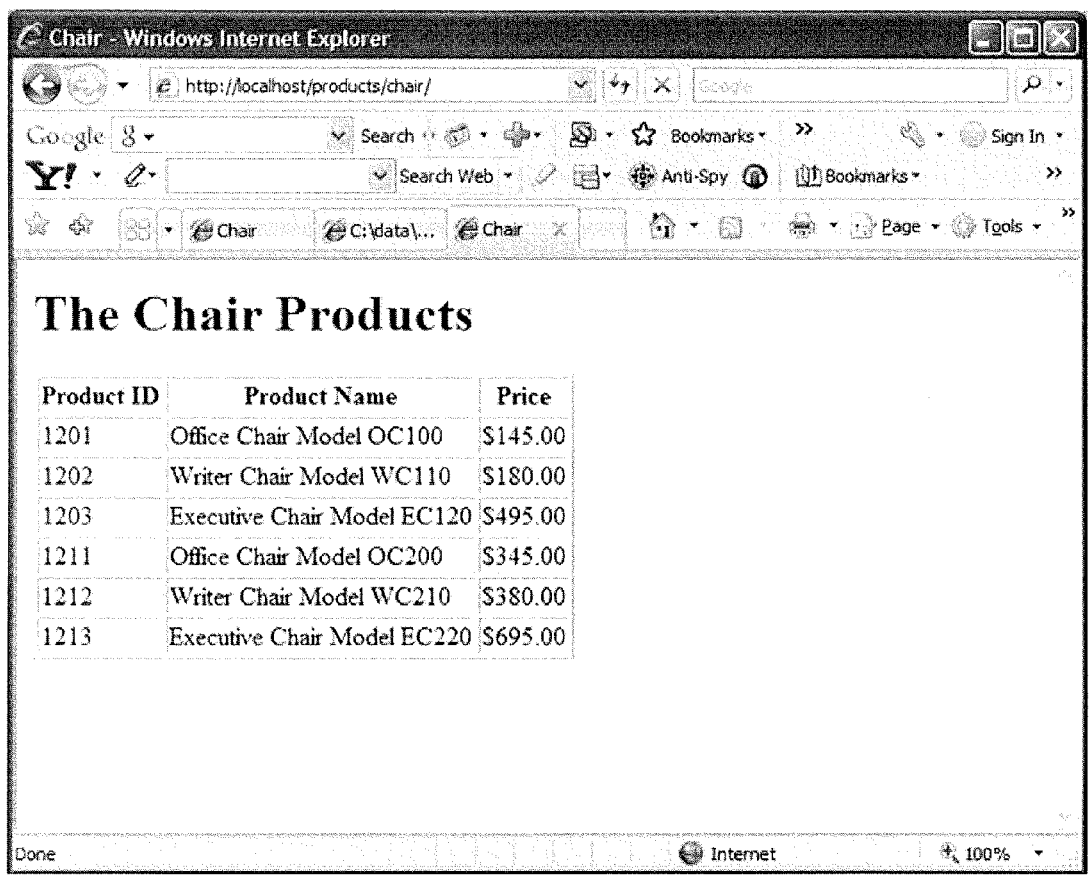

The illustrated example further describes FIG. 19 in that the results of the search, formatted in XHTML/HTML language, are appended to the generated target file mysearch-dec08a-2008.html. FIG. 27 shows the Web page with the file mysearch-dec08a-2008.html as its source file. A user can click to select the hyperlink:

products/desk/index.html to confirm that all the three strings: Computer, Executive, and Desk are in the Web page identified by this hyperlink as shown in FIG. 28. A user can also click to select the hyperlink:

products/chair/index.html to confirm that the string: Executive is in the Web page identified by this hyperlink as shown in FIG. 29.

The foregoing processes described above can be applied to the following illustrated example on providing input data to changeable fields from users in several departments. This is similar to the function of an assembly line, with multiple stations, for template files where changeable fields of a template file is filled by a user at one station resulting in the generation of a target file and subsequently new changeable fields are identified in the target file; the target file serves the role of a new template file whose changeable fields are to be filled by a user at the next station resulting in the generation of a newer target file. This process iterates from station to station until the last station resulting in the generation of the final version of the target file. An example is an order fulfillment service. Suppose three departments are involved: sales department, inventory department, and shipping department. An initial template file is created (e.g., named order.xml in the XML language format) with the content: (a method of identifying a new changeable field includes the removal of a flag from this field as to be discussed following this listing of the template file)

```
<?xml version = "1.0"?>
<?xml:stylesheet type = "text/xsl" href = "orderFullfillment.xsl"?>
<!-- Order Fullfillment Template   -->
<orderFullfillment>
  <!-- Order Template Segment   -->
  <order>
    <customerName value="%var%Customer_Name%evar%" />
    <orderDate value="%var%Order_Date%evar%" />
    <item quantity= "%var%Quantity%evar%">
      <productName>%var%Product_Name%evar%</productName>
      <salesAgentId>%var%Sales_Agent_ID%evar%</salesAgentId>
    </item>
  </order>
  <!-- Inventory Template Segment   -->
  <inventory>
    <inventoryDate value=
"%var%!NF!Check_Inventory_Date%evar%" />
    <productNumber>%var%!NF!Product_Number%evar%
    </productNumber>
    <inventoryClerkId>%var%!NF!Inventory_Clerk_ID%evar%
    </inventoryClerkId>
  </inventory>
  <!-- Shipment Template Segment   -->
  <shipment>
    <shipmentDate value="%var%!NF!Shipment_Date%evar%" />
    <shipmentAgentId>%var%!NF!Shipment_Agent_ID%evar%
    </shipmentAgentId>
```

```
    </shipment>
</orderFullfillment>
```

Figure 30A:
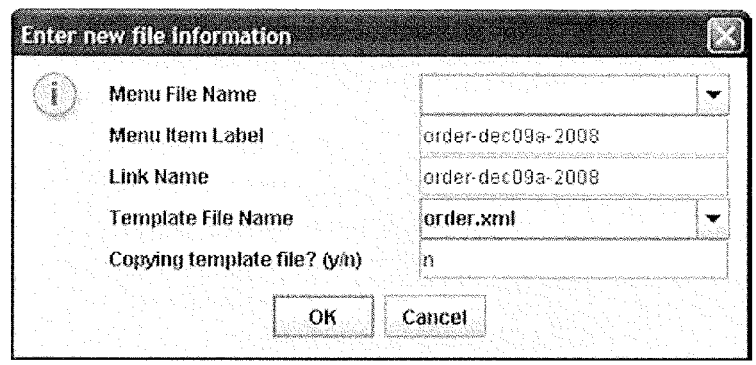
Figure 30B:
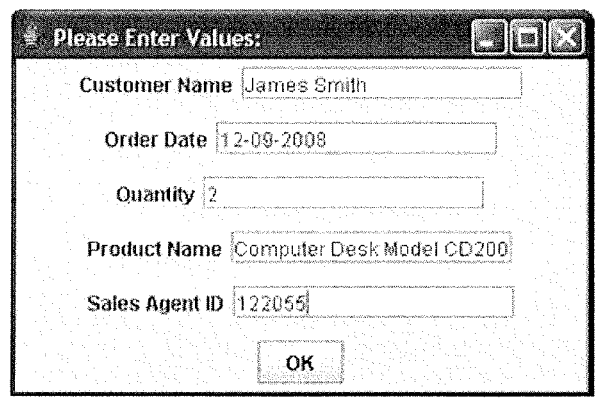

The above template has three segments: Order, Inventory, and Shipment. The latter two segments contain changeable fields prefixed with the flag: !NF!. This flag is provided to indicate to the processing system, identified as the file generation system in the claims, that a changeable field with this prefix is not to be filled with data in the next processing stage; but such a changeable field can be filled with data at a later processing stage when the flag !NF! is removed before the template file that contains this changeable field is to be processed. FIG. 30A shows that a sales agent in the sales department selects this template to generate a new target file. Suppose the name of the target file is order-dec09a-2008.xml. As was discussed before either a generated graphics user interface or a batch process can be used to collect user inputs. Suppose the graphics user interface approach is utilized. FIG. 30B displays the generated graphics user interface in which the sales agent entered the ordering related data as shown in the figure. The generated target file order-dec09a-2008.xml has the following content:

```
<?xml version = "1.0"?>
<?xml:stylesheet type = "text/xsl" href = "orderFullfillment.xsl"?>
<!-- Order Fullfillment Template    -->
<orderFullfillment>
    <!-- Order Template Segment    -->
    <order>
        <customerName value="James Smith" />
        <orderDate value="12-09-2008" />
        <item quantity= "2">
            <productName>Computer Desk Model CD200</productName>
            <salesAgentId>122055</salesAgentId>
        </item>
    </order>
    <!-- Inventory Template Segment    -->
    <inventory>
        <inventoryDate value=
        "%var%!NF!Check_Inventory_Date%evar%" />
        <productNumber>%var%!NF!Product_Number%evar%
        </productNumber>
        <inventoryClerkId>%var%!NF!Inventory_Clerk_ID%evar%
        </inventoryClerkId>
    </inventory>
    <!-- Shipment Template Segment    -->
    <shipment>
        <shipmentDate value="%var%!NF!Shipment_Date%evar%" />
        <shipmentAgentId>%var%!NF!Shipment_Agent_ID%evar%
        </shipmentAgentId>
    </shipment>
</orderFullfillment>
```

Next this sales agent removes the !NF! flag from the changeable fields in the Inventory template segment from the generated target file order-dec09a-2008.xml to let the processing system allow the Inventory department fill out data value for these changeable fields:

```
<?xml version = "1.0"?>
<?xml:stylesheet type = "text/xsl" href = "orderFullfillment.xsl"?>
<!-- Order Fullfillment Template    -->
<orderFullfillment>
    <!-- Order Template Segment    -->
    <order>
        <customerName value="James Smith" />
        <orderDate value="12-09-2008" />
        <item quantity= "2">
            <productName>Computer Desk Model CD200</productName>
            <salesAgentId>122055</salesAgentId>
        </item>
    </order>
    <!-- Inventory Template Segment    -->
    <inventory>
        <inventoryDate value="%var%Check_Inventory_Date%evar%" />
        <productNumber>%var%Product_Number%evar%
        </productNumber>
        <inventoryClerkId>%var%Inventory_Clerk_ID%evar%
        </inventoryClerkId>
    </inventory>
    <!-- Shipment Template Segment    -->
    <shipment>
        <shipmentDate value="%var%!NF!Shipment_Date%evar%" />
        <shipmentAgentId>%var%!NF!Shipment_Agent_ID%evar%
        </shipmentAgentId>
    </shipment>
</orderFullfillment>
```

Figure 31A:
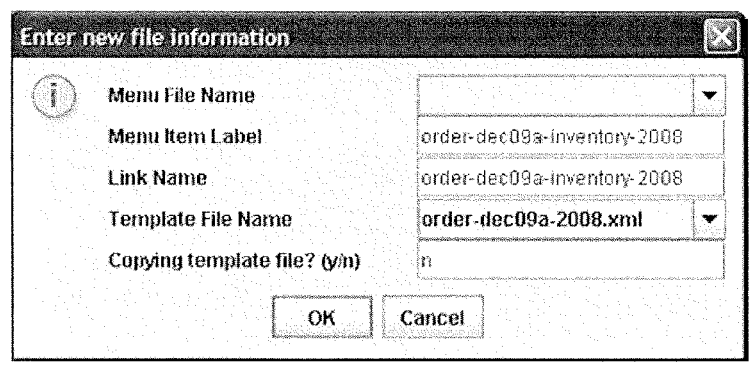
Figure 31B:
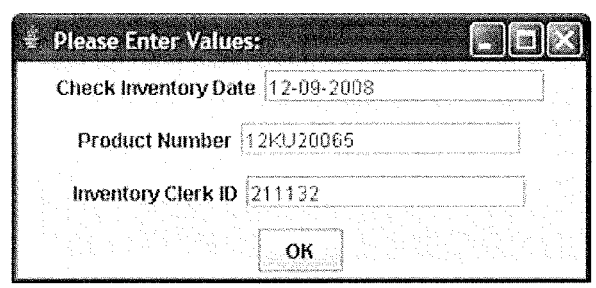

This sales agent then forwards this revised target file as a template file to the inventory department. FIG. 31A shows that a clerk in the inventory department selects this template file to generate a new target file. Suppose the name of the target file is order-dec09a-inventory-2008.xml. As was discussed before either a generated graphics user interface or a batch process can be used to collect user inputs. Suppose the graphics user interface approach is utilized. FIG. 31B displays the generated graphics user interface in which the clerk in the inventory department entered the inventory related data as shown in the figure. The generated target file order-dec09a-inventory-2008.xml has the following content:

```
<?xml version = "1.0"?>
<?xml:stylesheet type = "text/xsl" href = "orderFullfillment.xsl"?>
<!-- Order Fullfillment Template    -->
<orderFullfillment>
    <!-- Order Template Segment    -->
    <order>
        <customerName value="James Smith" />
        <orderDate value="12-09-2008" />
        <item quantity= "2">
            <productName>Computer Desk Model CD200</productName>
            <salesAgentId>122055</salesAgentId>
        </item>
    </order>
    <!-- Inventory Template Segment    -->
    <inventory>
        <inventoryDate value="12-09-2008" />
        <productNumber>12KU20065</productNumber>
        <inventoryClerkId>211132</inventoryClerkId>
    </inventory>
    <!-- Shipment Template Segment    -->
    <shipment>
        <shipmentDate value="%var%!NF!Shipment_Date%evar%" />
        <shipmentAgentId>%var%!NF!Shipment_Agent_ID%evar%
        </shipmentAgentId>
    </shipment>
</orderFullfillment>
```

Next this clerk removes the !NF! flag from the changeable fields in the Shipment template segment from the generated target file order-dec09a-inventory-2008.xml to let the processing system allow the Shipment department to fill out data value for these changeable fields:

```
<?xml version = "1.0"?>
<?xml:stylesheet type = "text/xsl" href = "orderFullfillment.xsl"?>
```

```
<!-- Order Fullfillment Template    -->
<orderFullfillment>
    <!-- Order Template Segment    -->
    <order>
        <customerName value="James Smith" />
        <orderDate value="12-09-2008" />
        <item quantity= "2">
            <productName>Computer Desk Model CD200</productName>
            <salesAgentId>122055</salesAgentId>
        </item>
    </order>
    <!-- Inventory Template Segment    -->
    <inventory>
        <inventoryDate value="12-09-2008" />
        <productNumber>12KU20065</productNumber>
        <inventoryClerkId>211132</inventoryClerkId>
    </inventory>
    <!-- Shipment Template Segment    -->
    <shipment>
        <shipmentDate value="%var%Shipment_Date%evar%" />
        <shipmentAgentId>%var%Shipment_Agent_ID%evar%
        </shipmentAgentId>
    </shipment>
</orderFullfillment>
```

Figure 32A:
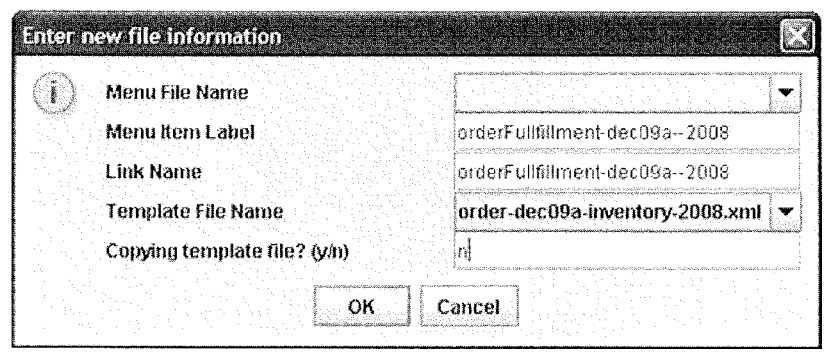
Figure 32B:
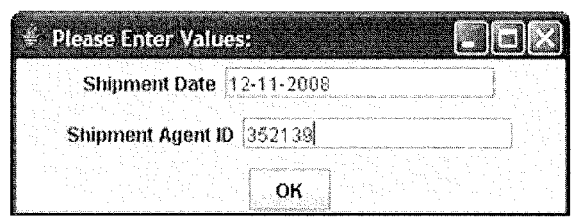

This clerk then forwards the revised target file as a template file to the shipping department. FIG. 32A shows that a shipment agent selects this template file to generate a new target file. Suppose the name of the target file is orderFullfillment-dec09a-2008.xml. As was discussed before either a generated graphics user interface or a batch process can be used to collect user inputs. Suppose the graphics user interface approach is utilized. FIG. 32B displays the generated graphics user interface in which the shipment agent in the shipping department entered the shipment related data as shown in the figure. The generated target file orderFullfillment-dec09a-2008.xml has the following content, which references an XSL file named orderFullfillment.xsl for formatting purpose:

```
<?xml version = "1.0"?>
<?xml:stylesheet type = "text/xsl" href = "orderFullfillment.xsl"?>
<!-- Order Fullfillment Template    -->
<orderFullfillment>
    <!-- Order Template    -->
    <order>
        <customerName value="James Smith" />
        <orderDate value="12-09-2008" />
        <item quantity= "2">
            <productName>Computer Desk Model CD200</productName>
            <salesAgentId>122055</salesAgentId>
        </item>
    </order>
    <!-- Inventory Template    -->
    <inventory>
        <inventoryDate value="12-09-2008" />
        <productNumber>12KU20065</productNumber>
        <inventoryClerkId>211132</inventoryClerkId>
    </inventory>
    <!-- Shipment Template    -->
    <shipment>
        <shipmentDate value="12-11-2008" />
        <shipmentAgentId>352139</shipmentAgentId>
    </shipment>
</orderFullfillment>
```

This generated target file is the final target file that reports the order fulfillment service. To transform this generated target file to an XHTML/HTML source file to be displayed by a Web browser, a file is created (e.g., an XSL file named orderFullfillment.xsl) with the following example content:

```
<?xml version = "1.0"?>
<!-- reference XSL stylesheet URI -->
<xsl:stylesheet version = "1.0"
xmlns:xsl = "http://www.w3.org/1999/XSL/Transform">
<xsl:output method = "html" omit-xml-declaration = "no"
doctype-system =
"http://www.w3c.org/TR/xhtml1/DTD/xhtml1-strict.dtd"
doctype-public = "-//W3C//DTD XHTML 1.0 Strict//EN"/>
<xsl:template match = "/"> <!-- match root element -->
<html xmlns="http://www.w3.org/1999/xhtml">
    <head>
        <title>Order Fullfillment</title>
    </head>
    <body>
        <h2> Order of <xsl:value-of select =
"orderFullfillment/order/customerName/@value" /> on
<xsl:value-of select = "orderFullfillment/order/orderDate/@value" />
</h2>
        <table border = "1" bgcolor = "cyan">
            <tr>
                <td>Product Name</td>
                <td><xsl:value-of select =
"orderFullfillment/order/item/productName"/></td>
            </tr>
            <tr>
                <td>Quantity</td>
                <td><xsl:value-of select = "orderFullfillment/order/item/
@quantity"/></td>
            </tr>
            <tr>
                <td>Sales Agent ID</td>
                <td><xsl:value-of select =
"orderFullfillment/order/item/salesAgentId"/></td>
            </tr>
            <tr>
                <td>Check Inventory Date</td>
                <td><xsl:value-of select =
"orderFullfillment/inventory/inventoryDate/@value"/></td>
            </tr>
            <tr>
                <td>Product Number</td>
                <td><xsl:value-of select =
"orderFullfillment/inventory/productNumber"/></td>
            </tr>
            <tr>
                <td>Inventory Clerk ID</td>
                <td><xsl:value-of select =
"orderFullfillment/inventory/inventoryClerkId"/></td>
            </tr>
            <tr>
                <td>Shipment Date</td>
                <td><xsl:value-of select =
"orderFullfillment/shipment/shipmentDate/@value"/></td>
            </tr>
            <tr>
                <td>Shipment Agent ID</td>
                <td><xsl:value-of select =
"orderFullfillment/shipment/shipmentAgentId"/></td>
            </tr>
        </table>
    </body>
</html>
</xsl:template>
</xsl:stylesheet>
```

Figure 33:
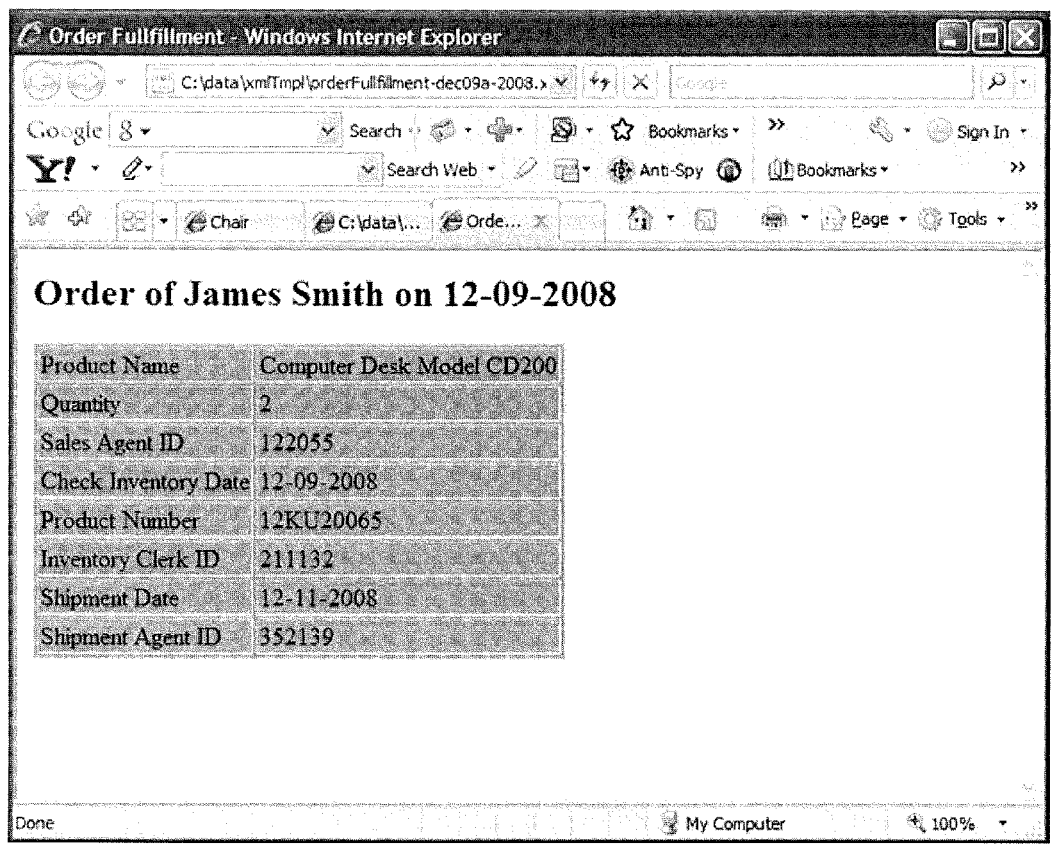

FIG. 33 displays the formatted view of the final target file orderFullfillment-dec09a-2008.xml in a screen of the Web browser.

The forgoing detailed description shows that the exemplary embodiments of the present invention are well suited to fulfill some or all of the purposes above-stated. It is recognized that those skilled in the art may make a variety of modifications or additions to the embodiments chosen to illustrate the present invention without departing from the spirit and proper scope of the invention. Therefore, it is to be understood that the protection sought and to be afforded hereby should be deemed to extend to the subject matter defined by the appended claims, including all fair equivalents thereof.

What is claimed is:

1. A computer-based method for generating a file, comprising:
    enabling a user to select a template file from a plurality of template files via a user interface configured to be displayed on a computer display to the user, wherein the template files include changeable fields associated with corresponding field delimiters and prompting labels configured to facilitate dynamic generation of an information exchange user interface, and wherein at least two of the plurality of template files have different quantities of changeable fields;
    accessing from computer readable memory an incomplete software program file containing variable name locations;
    parsing, using a processor, the program file to locate the variable name locations;
    inserting the label names obtained from the template file selected by the user in the variable name locations to further complete the software program file; and
    storing the software program file, including the inserted label names, in computer readable memory.

2. The method as defined in claim 1, the method further comprising enabling the execution of the program stored in the program file, wherein the program is configured to generate a user interface including the inserted label names and corresponding user input fields via which the user can provide data corresponding to changeable fields in the selected template file and/or retrieves data for the changeable fields from a data file previously created by a user or a system via a batch process that utilizes a computer operating system input redirection facility.

3. The method as defined in claim 2, wherein the user and/or system provided data are inserted into the changeable fields of the template file to generate a target file.

4. The method as defined in claim 3, wherein the target file includes an XML, XHTML/HTML, and/or WML document.

5. The method as defined in claim 3, wherein the target file includes a document that supports a Business-to-Business Internet application.

6. The method as defined in claim 5, wherein the Business-to Business Internet application is a Web service.

7. The method as defined in claim 3, wherein the template file contains multiple template segments that can be completed at multiple stations connected through a network in an assembly-line like setting, and wherein users at the multiple stations can sequentially enter and/or specify a data source in respective multiple template segments.

8. The method as defined in claim 3, wherein for at least a portion of template segments for the template file, the template file contains references to template segments in collections of template segments respectively stored on multiple stations connected through a network in an assembly-line like setting instead of the template segments themselves, wherein each identified template segment at a given station can be retrieved from the collection of template segments at the given station and inserted into the template file, wherein users at the multiple stations can sequentially enter and/or specify a data source in respective multiple template segments.

9. The method as defined in claim 2, wherein the user and/or system provided data are inserted into the changeable fields of the template file to generate a target file, wherein the user and/or system-provided data include text data and/or a reference to one or more external files.

10. The method as defined in claim 9, wherein the reference to at least one external file is a hyperlink.

11. The method as defined in claim 9, wherein the one or more external files include a text file and/or a non-text file, wherein the non-text file is a binary file or a graphics image file.

12. The method as defined in claim 2, the method further comprising enabling a search to be performed using the user and/or system-provided data as a search parameter to search for information from other sources.

13. The method as defined in claim 2, the method further comprising:
    enabling a search to be performed using the user and/or system-provided data as a search parameter to search for information from other sources; and
    inserting results of the search into the generated target file.

14. The method as defined in claim 2, the method further comprising:
    enabling a search to be performed using the user and/or system-provided data as a search parameter to search for information from other sources;
    formatting the search results in accordance with a first formatting instruction; and
    inserting the formatted search results into the generated target file.

15. The method of claim 1, wherein the target file includes software code written in a markup language.

16. The method of claim 1, wherein the template provides a framework for a website layout.

\* \* \* \* \*